US010332066B1

(12) United States Patent
Palaniappan et al.

(10) Patent No.: US 10,332,066 B1
(45) Date of Patent: Jun. 25, 2019

(54) ITEM MANAGEMENT SYSTEM USING WEIGHT

(71) Applicant: AMAZON TECHNOLOGIES, INC., Seattle, WA (US)

(72) Inventors: Ramanathan Palaniappan, Issaquah, WA (US); Navid Shiee, Seattle, WA (US); Xiaofeng Ren, Yarrow Point, WA (US); Michel Leonard Goldstein, Seattle, WA (US); Dilip Kumar, Seattle, WA (US); Gopi Prashanth Gopal, Redmond, WA (US); Ohil Krishnamurthy Manyam, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/673,739

(22) Filed: Mar. 30, 2015

(51) Int. Cl.
*G06K 15/00* (2006.01)
*G06Q 10/08* (2012.01)
*G01G 19/52* (2006.01)

(52) U.S. Cl.
CPC .......... *G06Q 10/087* (2013.01); *G01G 19/52* (2013.01)

(58) Field of Classification Search
CPC ................. G01G 19/4144; G01G 23/017
USPC ........... 235/383; 177/1, 25.11–25.19; 705/28
See application file for complete search history.

(56) References Cited

U.S. PATENT DOCUMENTS

| | | | |
|---|---|---|---|
| 4,108,363 A * | 8/1978 | Susumu | .................... G07F 7/00 177/245 |
| 5,767,454 A | 6/1998 | Goodwin, III | |
| 6,080,938 A | 6/2000 | Lutz | |
| 6,794,586 B1 | 9/2004 | Mason | |
| 7,180,014 B2 | 2/2007 | Farber et al. | |
| 7,225,980 B2 | 6/2007 | Ku et al. | |
| 7,246,745 B2 | 7/2007 | Hudnut et al. | |
| 7,693,758 B1 | 4/2010 | Bacco et al. | |
| 7,813,973 B2 * | 10/2010 | Gudbjartsson | ....... G06Q 10/087 177/25.13 |
| 7,949,568 B2 | 5/2011 | Fano et al. | |
| 8,009,864 B2 | 8/2011 | Linaker et al. | |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Jamara A Franklin
(74) *Attorney, Agent, or Firm* — Lindauer Law, PLLC

(57) ABSTRACT

An inventory location such as a shelf may be used to stow different types of items, with each type of item in a different partitioned area or section of the shelf. Weight data from weight sensors coupled to the shelf is used to determine a change in weight of the shelf and a change in the center-of-mass ("COM") of the items on the shelf. Based on the weight data and item data indicative of what items are stowed in particular partitioned areas, activity such as a pick or place of an item and the partitioned area in which the activity occurred may be determined. Data from other sensors, such as a camera, may be used to confirm the occurrence of the activity, disambiguate the determination of the particular partitioned area, and so forth.

22 Claims, 17 Drawing Sheets

(56) References Cited

U.S. PATENT DOCUMENTS

| | | | |
|---|---|---|---|
| 8,189,855 | B2 | 5/2012 | Opalach et al. |
| 8,201,737 | B1 | 6/2012 | Palacios Durazo et al. |
| 8,239,268 | B2 * | 8/2012 | Iizaka .............. G06Q 20/201 235/375 |
| 8,325,036 | B1 | 12/2012 | Fuhr et al. |
| 8,438,084 | B1 | 5/2013 | Tesler et al. |
| 8,456,293 | B1 | 6/2013 | Trundle et al. |
| 8,566,183 | B1 | 10/2013 | Bonar et al. |
| 8,630,924 | B2 | 1/2014 | Groenevelt et al. |
| 9,235,928 | B2 | 1/2016 | Medioni et al. |
| 9,349,238 | B2 | 5/2016 | Tkachenko et al. |
| 2003/0019931 | A1 | 1/2003 | Tsikos et al. |
| 2003/0078693 | A1 | 4/2003 | Chavez et al. |
| 2003/0078849 | A1 | 4/2003 | Snyder |
| 2003/0120547 | A1 | 6/2003 | Walter et al. |
| 2004/0065740 | A1 | 4/2004 | Mergenthaler et al. |
| 2004/0084168 | A1 | 5/2004 | Mandel |
| 2006/0052980 | A1 | 3/2006 | Lafollette et al. |
| 2007/0255455 | A1 | 11/2007 | Busacca et al. |
| 2008/0035390 | A1 | 2/2008 | Wurz |
| 2008/0079584 | A1 | 4/2008 | Tabet et al. |
| 2008/0218338 | A1 | 9/2008 | Schoettle |
| 2009/0012818 | A1 | 1/2009 | Rodgers |
| 2009/0022362 | A1 | 1/2009 | Gagvani et al. |
| 2009/0222359 | A1 | 9/2009 | Henry |
| 2009/0278696 | A1 | 11/2009 | Lindh et al. |
| 2010/0327001 | A1 | 12/2010 | Godlewski |
| 2011/0011936 | A1 | 1/2011 | Morandi et al. |
| 2011/0214457 | A1 | 9/2011 | Han et al. |
| 2011/0232972 | A1 | 9/2011 | McQueen et al. |
| 2012/0284132 | A1 | 11/2012 | Kim et al. |
| 2013/0027550 | A1 | 1/2013 | Evangelio et al. |
| 2013/0085893 | A1 | 4/2013 | Bhardwaj et al. |
| 2013/0118814 | A1 | 5/2013 | Michael |
| 2013/0147917 | A1 | 6/2013 | Lee et al. |
| 2013/0229518 | A1 | 9/2013 | Reed et al. |
| 2013/0235206 | A1 | 9/2013 | Smith et al. |
| 2013/0284806 | A1 | 10/2013 | Margalit |
| 2014/0102957 | A1 | 4/2014 | Broeker et al. |
| 2014/0111199 | A1 | 4/2014 | Oh et al. |
| 2014/0111333 | A1 | 4/2014 | Haas |
| 2014/0125584 | A1 | 5/2014 | Xun et al. |
| 2014/0235976 | A1 | 8/2014 | Bresch et al. |
| 2014/0314278 | A1 | 10/2014 | Tatsuzawa et al. |
| 2014/0316916 | A1 | 10/2014 | Hay |
| 2015/0012396 | A1 | 1/2015 | Puerini et al. |
| 2015/0015716 | A1 | 1/2015 | Reed et al. |
| 2015/0019391 | A1 | 1/2015 | Kumar et al. |
| 2015/0023605 | A1 | 1/2015 | Tsuyuzaki |
| 2015/0081188 | A1 | 3/2015 | Kornhaas |
| 2015/0083817 | A1 | 3/2015 | Kim et al. |
| 2015/0086107 | A1 | 3/2015 | Dedeoglu et al. |
| 2015/0090503 | A1 | 4/2015 | McQueen et al. |
| 2015/0120619 | A1 | 4/2015 | Baughman et al. |
| 2015/0127496 | A1 | 5/2015 | Marathe et al. |
| 2015/0173670 | A1 | 6/2015 | Simon |
| 2015/0178545 | A1 | 6/2015 | Thorsted et al. |
| 2015/0227882 | A1 | 8/2015 | Bhatt |
| 2015/0262460 | A1 | 9/2015 | Ito |
| 2015/0302568 | A1 | 10/2015 | Hirai et al. |
| 2015/0310451 | A1 | 10/2015 | Plagens et al. |
| 2015/0317841 | A1 | 11/2015 | Karsch et al. |
| 2016/0106236 | A1 | 4/2016 | Kwiatek et al. |
| 2016/0113422 | A1 | 4/2016 | Huffar et al. |
| 2016/0202111 | A1 | 7/2016 | Fahey et al. |
| 2017/0103266 | A1 | 4/2017 | Migdal et al. |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_super_markets>.

Pop, Cristian, "Introduction to the BodyCom Technology", AN1391, DS01391A, Microchip Technology, Inc., May 2, 2011.

Hess, Daniel A., "Non-Final Office Action dated Apr. 1, 2016", U.S. Appl. No. 14/673,410, The United States Patent and Trademark Office, Apr. 1, 2016.

Mahone, Kristie A., "Non-Final Office Action dated Apr. 21, 2017", U.S. Appl. No. 14/673,794, The United States Patent and Trademark Office, Apr. 21, 2017.

Hess, Daniel A., "Non-final Office Action dated Aug. 15, 2017", U.S. Appl. No. 14/673,410, The United States Patent and Trademark Office, Aug. 15, 2017.

Mahone, Kristie A., "Final Office Action dated Oct. 16, 2017", U.S. Appl. No. 14/673,794, The United States Patent and Trademark Office, Oct. 16, 2017.

Hess Daniel A., "Final Office Action dated Jan. 17, 2018", U.S. Appl. No. 14/672,410, The United States Patent and Trademark Office, Jan. 17, 2018.

Mahone, Kristie A., "Advisory Action dated Jan. 9, 2018", U.S. Appl. No. 14/673,794, The United States Patent and Trademark Office, Jan. 9, 2018.

Hess, Daniel A., "Notice of Allowance dated May 21, 2018", U.S. Appl. No. 14/673,410, The United States Patent and Trademark Office, May 21, 2018.

* cited by examiner

ITEM MANAGEMENT SYSTEM USING WEIGHT

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
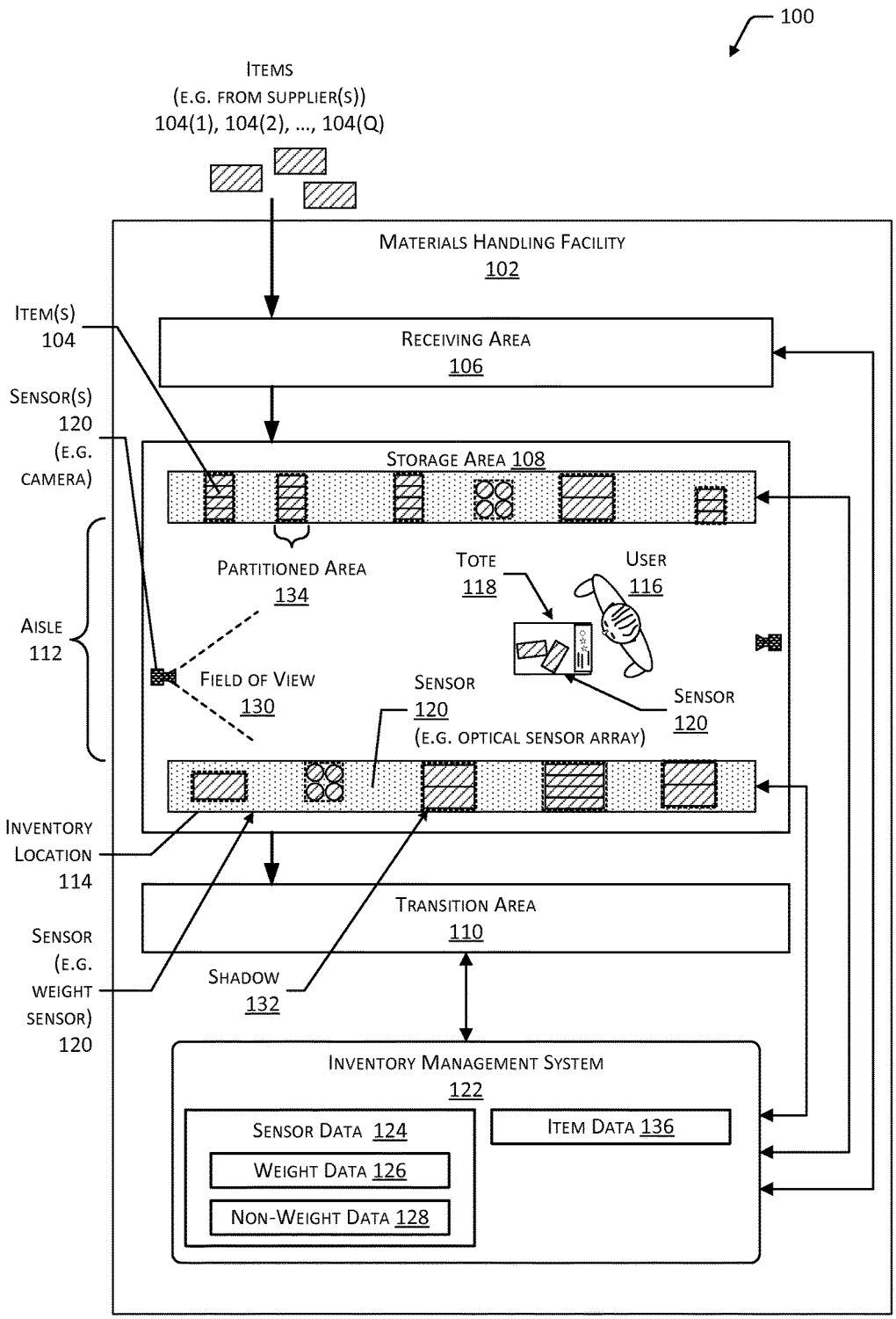
FIG. 1 is a block diagram illustrating a materials handling facility (facility) having weight sensors, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for processing weight data from weight sensors. The weight data may be used to determine interactions with items stowed in inventory locations in a materials handling facility (facility) or other setting. The facility may include, or have access to, an inventory management system. The inventory management system may be configured to maintain information about items, users, condition of the facility, and so forth. For example, the inventory management system may maintain data indicative of a number of items at a particular inventory location, what items a particular user is ordered to pick, how many items have been picked or placed at the inventory location, requests for assistance, environmental status of the facility, and so forth.

Operation of the facility may be facilitated by using one or more sensors to acquire information about interactions in the facility. Interactions may comprise the user picking an item from an inventory location, placing an item at an inventory location, touching an item, bringing an object such as a hand or face close to an item, and so forth. For example, the inventory management system may use interaction data that indicates what item a user picked from a particular inventory location to adjust the count of inventory stowed at the particular inventory location.

Described in this disclosure are devices and techniques for gathering and processing weight data from one or more weight sensors. The weight sensors may be used to gather weight data about items stowed at an inventory location, such as a shelf. For example, load cells at or near each end of the shelf, at or near each of the four corners of a rectangular shelf, or in other configurations, may generate weight data indicative of a load at the inventory location.

The weight data may be used to determine data such as a quantity of items that have been picked from or placed to an inventory location, to determine the identity of an item that has been picked from or placed to the inventory location, and so forth. Use of weight sensors and the weight data they provide offers several operational benefits, especially in a materials handling facility or other facility. However, the presence of different items at the same inventory location, the presence of different items with the same or similar weights, noise in the weight data resulting from vibration, and so forth, may result in the inventory management system making erroneous determinations from the weight data.

Non-weight data from other sensors such as cameras, optical sensor arrays, proximity sensors, and so forth, may be used in conjunction with the weight data to ameliorate these and other issues. For example, the weight data may be used to choose from a plurality of hypotheses, where each hypothesis describes a different combination of identity of an item and quantity of that item that may have been picked from an inventory location. To select from among these plurality of hypotheses, non-weight data may be used. For example, images from a camera with a field-of-view (FOV) that includes the inventory location may be used to determine the presence of a hand of the user at a particular partitioned area (or lane) in the inventory location. The hypothesis that corresponds to this lane may be confirmed, and used to update the count of inventory stowed at the inventory location.

Non-weight data may also be used to determine when the weight data acquired by the weight sensors is reliable. The weight sensors may generate weight data that contains noise or spurious data, that is, information which is not representative of a measured weight or change in weight of the load. Such noise may make the weight data unreliable. For example, vibration may result in the weight sensors generating spurious weight data that indicates a change in weight, when in actuality the load on the weight sensors has not changed.

The non-weight data may be processed to determine activity data that is indicative of activity (or the lack thereof) at the inventory location. For example, changes in the image data acquired by a camera or optical sensor array may provide information indicative of an activity such as the movement of a hand at or near the inventory location.

Using the activity data, reliability data may be generated that indicates the reliability of the weight data at a given time. For example, by knowing that no hand was present at the inventory location at time=1, weight data generated up to this time may be deemed unreliable. This unreliable weight data may be disregarded, avoiding errors due to noise such as caused by a passing train shaking the inventory location.

Continuing the example, from time=3 through time=6, the user may be removing an item from the inventory location. This activity may cause noise in the weight data, such as from ringing or oscillation of the inventory location, touch of the user's hand, and so forth. The weight data thus obtained from time=3 through time=6 may be deemed to be unreliable.

By determining when the activity of picking an item is taking place, the weight data obtained before and after the activity may be deemed reliable and used to determine the change in weight, COM, and so forth. Further continuing the example, first weight data obtained at time=2 (during a stable time before the activity of the user) may thus be deemed to be reliable. Similarly, second weight data obtained at time=7 (after the activity of the user is concluded) may be deemed to be reliable.

In some implementations, the determination that an activity is in progress may act as a trigger for the processing of weight data, or may be used to determine how the weight data is processed. For example, image data may be used to determine activity data indicative of approach of a user's hand, before contact is made with an item or the inventory location. This activity data may act as a trigger to begin processing of the weight data. As a result, errors resulting from weight data that is noisy or otherwise unreliable may be reduced or eliminated.

Activity data that indicates no activity at the inventory location may be used to disregard or change the processing of weight data. For example, one of the plurality of weight sensors measuring an inventory location may fail, resulting in weight data having a value of zero from that particular weight sensor while the load at the inventory location has remained unchanged. By using the activity data indicating no determined activity, this weight data may be suppressed and prevented from changing the quantity on hand maintained by the inventory management system. However, this data may be used to generate an error report to initiate diagnostic, repair, maintenance, or other actions to resolve the malfunction.

In some implementations, the sensor data may be processed to generate intermediate data. For example, the weight data may be processed to determine weight characteristic data such as weight change data, weight distribution data, location of weight change (LWC) data, center-of-mass (COM) data, and so forth. In another example, the image data may be processed to determine intermediate data such as a binary image. The intermediate data may be used to determine the activity data. For example, the binary image may be processed using an artificial neural network to recognize a shape of a user's hand, resulting in activity data indicating the presence of the user's hand.

The activity data may be indicative of a location (relative to an inventory location) of an action, motion of the activity, duration of the activity, a user identifier associated with the activity, and so forth. For example, the activity data may indicate that a hand of the user was present, moved towards a point on the inventory location, moved away from the point, and lasted for 1300 milliseconds.

The inventory location, or the sensor data associated with the inventory location, may be segmented into one or more partitioned areas. Each partitioned area may correspond to an area, such as a lane, at the inventory location that is assigned to a particular item. For example, the inventory location may be a shelf having three lanes, with a different type of pet food in each lane.

The intermediate data, activity data, and so forth, may be processed to generate interaction data. The interaction data may provide information about an interaction, such as a pick of an item from the inventory location, a place of an item to the inventory location, a touch made to an item at the inventory location, a gesture associated with an item at the inventory location, and so forth. The interaction data may include one or more of the type of interaction, partitioned area involved, item identifier, quantity change to the item, user identifier, and so forth. For example, the interaction data may indicate that a pick removing two cans of dog food from a particular partitioned area took place.

The inventory management system may use the interaction data to maintain item data about the items in the facility. For example, where interaction data indicates a pick of a particular quantity of a particular item from a particular location, the item data indicative of quantity on hand of that particular item at that particular location may be decreased accordingly.

By using the devices and techniques described herein, operation of the facility may be improved. Details about interactions between users and items in the facility may be quickly and accurately determined. For example, as items are picked, placed, touched, and so forth, information such as inventory levels or metrics about touch may be readily determined. As a result, the inventory management system may be able to quickly track what item a user has interacted with, maintain up-to-date item data, and so forth.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), ..., 104(Q) may be held. As used in this disclosure, letters in parenthesis such as "(Q)" indicate an integer value greater than or equal to zero. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding, supporting, or storing the items 104. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), ..., 116(U) and totes 118(1), 118(2), ..., 118(T) or other material handling apparatus may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the tote 118 may include a basket, cart, bag, bin, and so forth. The tote 118 is discussed in more detail below with regard to FIG. 5. In other implementations, other material handling apparatuses such as robots, forklifts, cranes, aerial drones, and so forth, may move about the facility 102 picking, placing, or otherwise moving the items 104. For example, a robot may pick an item 104 from a first inventory location 114(1) and move the item 104 to a second inventory location 114(2).

One or more sensors 120 may be configured to acquire information in the facility 102. The sensors 120 may include, but are not limited to, cameras, three-dimensional (3D) sensors, weight sensors, optical sensor arrays, proximity sensors, and so forth. The sensors 120 may be stationary or mobile, relative to the facility 102. For example, the inventory locations 114 may contain weight sensors 120(6) to acquire weight data of items 104 stowed therein, cameras to acquire images of picking or placement of items 104 on shelves, optical sensor arrays to detect shadows of the user's 116 hands at the inventory locations 114, and so forth. In another example, the facility 102 may include cameras 120(1) to obtain images of the user 116 or other objects in the facility 102. The sensors 120 are discussed in more detail below with regard to FIG. 2.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated in the facility 102.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

During operation of the facility 102, the sensors 120 may be configured to provide sensor data 124, or information based on the sensor data 124, to the inventory management system 122. The sensor data 124 may include weight data 126 obtained from weight sensors 120(6), non-weight data 128 obtained from other sensors 120 such as cameras 120(1), 3D sensors 120(2), optical sensor arrays 120(13), proximity sensors 120(14), and so forth. The sensors 120 are described in more detail below.

The weight data 126 comprises data generated by one or more weight sensors 120(6) configured to measure the weight of an inventory location 114 that may stow the items 104. For example, the weight sensor 120(6) may comprise a load cell beneath a load that may include a shelf or platform of the inventory location 114. By reading one or more characteristics of the load cell, the weight of the load may be determined.

The non-weight data 128 may comprise data generated by the non-weight sensors 120, such as cameras 120(1), 3D sensors 120(2), buttons 120(3), touch sensors 120(4), microphones 120(5), optical sensors 120(7), RFID readers 120(8), RF receivers 120(9), accelerometers 120(10), gyroscopes 120(11), magnetometers 120(12), optical sensor arrays 120(13), proximity sensors 120(14), and so forth. For example, cameras 120(1) may be arranged to have a field of view (FOV) 130 that includes at least a portion of the inventory location 114. Continuing the example, the camera 120(1)

may be mounted above the inventory location 114 with the FOV 130 oriented to where the items 104 may be stowed during use.

The inventory management system 122 or other systems may use the sensor data 124 to track the location of objects within the facility 102, movement of the objects, or provide other functionality. Objects may include, but are not limited to, items 104, users 116, totes 118, and so forth. For example, a series of images acquired by the camera 120(1) may indicate removal by the user 116 of an item 104 from a particular location on the inventory location 114 and placement of the item 104 on or at least partially within the tote 118.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage in the storage area 108. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a user 116 may purchase or rent the items 104 and remove the items 104 from the facility 102. During use of the facility 102, the user 116 may move about the facility 102 to perform various tasks, such as picking or placing the items 104 in the inventory locations 114.

Objects such as an item 104, hand, robotic manipulator, retrieval tool, and so forth, may exhibit a shadow 132 with respect to the optical sensor array 120(13) at an inventory location 114. The shadow 132 is illustrated with a dotted line in this figure. In one implementation, the optical sensor array 120(13) may be located below the item 104, such as within a shelf upon or above which the item 104 is supported. The shadow 132 may be cast upon the optical sensor array 120(13) regardless of position of the shadow with respect to the item 104. For example, where the optical sensor array 120(13) is on a vertical wall behind the items 104, the shadow 132 may comprise the shadow cast on that wall.

The optical sensor array 120(13) may comprise one or more sensors 120, such as optical sensors 120(7). The optical sensors 120(7) may be arranged in a regular, repeating, or periodic two-dimensional arrangement such as a grid. Each of the optical sensors 120(7) may be configured to provide output indicative of a light intensity value. For example, the optical sensors 120(7) may generate an 8-bit value indicative of an intensity of light ranging from value 255 indicating maximum intensity to value 0 indicating minimum intensity. In another implementation, the light intensity value may be a 1-bit value of 0 or 1. Implementations of the optical sensor array 120(13) are described below in more detail, such as with regard to FIGS. 6 through 9.

A single optical sensor array 120(13) may be associated with several different items 104. For example, the inventory location 114 may comprise a shelf that includes an optical sensor array 120(13). The shelf may have sufficient space to allow for storage of several different kinds of items 104. Items 104 may be grouped together and placed within a partitioned area 134. For example, a left half of the shelf may store a first kind of item 104, while a right half of the shelf may store a second kind of item 104. The inventory management system 122 may be configured to access partition data indicative of which portion of the optical sensor array 120(13), or an output thereof, is associated with a particular item 104. For example, the partitioned area 134 may comprise a lane or row of identical items 104 positioned one in front of another.

The optical sensor array 120(13) may generate non-weight data 128 such as image data. The image data may comprise a plurality of pixels. Each pixel may correspond to a position within the two-dimensional arrangement of the optical sensors 120(7) and also comprises the light intensity value from the optical sensor 120(7) at the position. In some implementations, the image data may comprise data from a subset of the optical sensors within the optical sensor array 120(13). For example, the image data may comprise information from the optical sensors 120(7) corresponding to a particular partitioned area 134. In another example, image data from an optical sensor array 120(13) having a plurality of partitioned areas 134 may be segmented into the respective partitioned areas 134 for further processing.

The inventory management system 122 is configured to use the sensor data 124 and the item data 136 to generate interaction data. The interaction data may provide information about an interaction, such as a pick of an item 104 from the inventory location 114, a place of an item 104 to the inventory location 114, a touch made to an item 104 at the inventory location 114, a gesture associated with an item 104 at the inventory location 114, and so forth.

The interaction data may include one or more of the type of interaction, partitioned area 134 involved, item identifier, quantity change to the item 104, user identifier, and so forth. The interaction data may then be used to further update the item data 136. For example, the quantity of items 104 on hand at a particular partitioned area 134 may be changed based on an interaction that picks or places one or more items 104.

The inventory management system 122 may use the sensor data 124 to determine the interaction. Weight characteristics about an interaction may be determined using the weight data 126. These weight characteristics may include weight before an interaction, weight after an interaction, amount of change in the weight of the inventory location 114, a change in the COM or distribution of weight at the inventory location 114, and so forth. For example, an inventory location 114 may stow a single type of item 104. A count of the quantity of items 104 picked or placed may be determined by dividing the change in weight associated with an interaction by the weight of a single item 104 as stored in the item data 136.

In some implementations, a single inventory location 114 may stow several different types of items 104, such as arranged in different partitioned areas 134 as described above. The inventory management system 122 may use the weight data 126 to determine weight characteristics, and use those weight characteristics to identify the item 104 that was picked or placed. For example, a direction and distance of a change in the COM may be indicative of a pick or place of an item 104 from a particular partitioned area 134. The inventory management system 122 may also use the weight data 126 to determine the quantity picked or placed during an interaction, such as described above. However, in some situations, the same set of weight characteristics may correspond to several possible hypotheses. For example, given cans of approximately equal weight, placement of two cans of pet food at a first distance from an origin may result in the same change in the COM as a placement of one can at twice that distance from the origin. Other non-weight data 128 may be processed and used to select a particular hypothesis.

The inventory management system 122 may be configured to access hypotheses that correspond to the weight characteristics associated with an interaction. The non-weight data 128, such as image data from cameras 120(1) with a FOV 130 that includes at least a portion of the partitioned area 134 may be used to select one or more of the hypotheses that correspond. For example, the hypotheses may include a first hypothesis indicating placement of two cans of pet food at partitioned area 134(1) and one can of pet food at partitioned area 134(2). Given image data obtained from a camera 120(1) indicative of activity (such as the image of the user's 116 hand) at the partitioned area 134(1), those hypotheses associated with the partitioned area 134(2) may be discarded.

In some implementations, the hypotheses may be selected based at least in part on a score. The scores may be determined by the degree of correspondence between the sensor data 124, or information based thereon, and the predicted values of the hypotheses. A higher score may be indicative of a closer correspondence between the predicted values and the data measuredly observed. For example, a high scoring hypothesis may predict values of a change in one or more weight characteristics that are within 5% of the measured weight data 126, while a lower scoring hypothesis may have values that are within 20% of the measured weight data 126.

The process of using the weight data 126 and the non-weight data 128 to generate interaction data is discussed in more detail below. For example, FIGS. 13-15 describe various processes for determining a hypothesis based on information derived from weight data 126 and non-weight data 128.

The inventory management system 122 may also use the non-weight data 128 to determine reliability data about the weight data 126. The weight data 126 may include noise or erroneous information. For example, vibration from a tote 118 bumping into the inventory location 114 may cause an oscillation in the platform of the inventory location 114 that supports a load of items 104. The weight sensors 120(6) may thus produce weight data 126 that is "noisy" or otherwise unreliable, indicating a change in weight when no such change has measuredly taken place. Use of this unreliable data may result in erroneous output, such as causing the quantity of items 104 on hand at that inventory location 114 to incorrectly change.

The non-weight data 128 may be used to determine when the weight data 126 acquired by the weight sensors 120(6) is reliable. The non-weight data 128 may be processed to determine activity data that is indicative of activity (or the lack thereof) at the inventory location 114. For example, changes in the image data acquired by a camera 120(1) or optical sensor array 120(13) may provide information indicative of an activity such as the movement of a hand of the user 116 at or near the inventory location 114.

Using the activity data, reliability data may be generated that indicates the reliability of the weight data 126 at a given time. For example, by knowing that no hand was present at the inventory location 114 at a particular time, weight data 126 generated up to this time may be deemed unreliable. The unreliable weight data 126 may be disregarded, avoiding errors due to noise such as caused by a passing train shaking the inventory location 114. Likewise, activity data indicative of the user 116 reaching for an item 104 on the shelf of the inventory location 114 may be used to deem the weight data 126 as reliable.

In some implementations, the activity data may be used to trigger when or how weight data 126 is processed. For example, the activity data indicative of the user 116 reaching towards the inventory location 114 may result in the inventory management system 122 processing the contemporaneously acquired weight data 126 to determine weight characteristics and generate interaction data.

The process of using the weight data 126 and the non-weight data 128 to provide reliability data, and the use thereof, is discussed in more detail below. For example, FIGS. 16-17 describe various processes for determining the reliability of the weight data 126 based on non-weight data 128.

In some implementations, items 104 may be processed, such as at the receiving area 106, to generate at least a portion of the item data 136. For example, an item 104 not previously stored by the inventory management system 122 may be placed on an optical sensor array 120(13) and a shadow 132 may be generated as part of a process to receive the item 104 into the facility 102. Continuing the example, the item data 136 generated may include acquiring the weight of a single item 104, determining COM of the single item 104, an area of the shadow 132, absorption threshold comprising data indicative of transparency of the item 104, and so forth.

By using the weight data 126 in conjunction with non-weight data 128, the inventory management system 122 is able to maintain item data 136 such as inventory levels of a particular item 104 at a particular inventory location 114, generate billing information without manual intervention by a user 116, or provide other functions. For example, the user 116 may pick an item 104 from the inventory location 114. Using the interaction data based on the sensor data 124 and in conjunction with the item data 136, the inventory management system 122 may correctly determine that a quantity of one can of dog food has been picked, and bill the user 116 accordingly for the sale price of the item 104.

Figure 2:
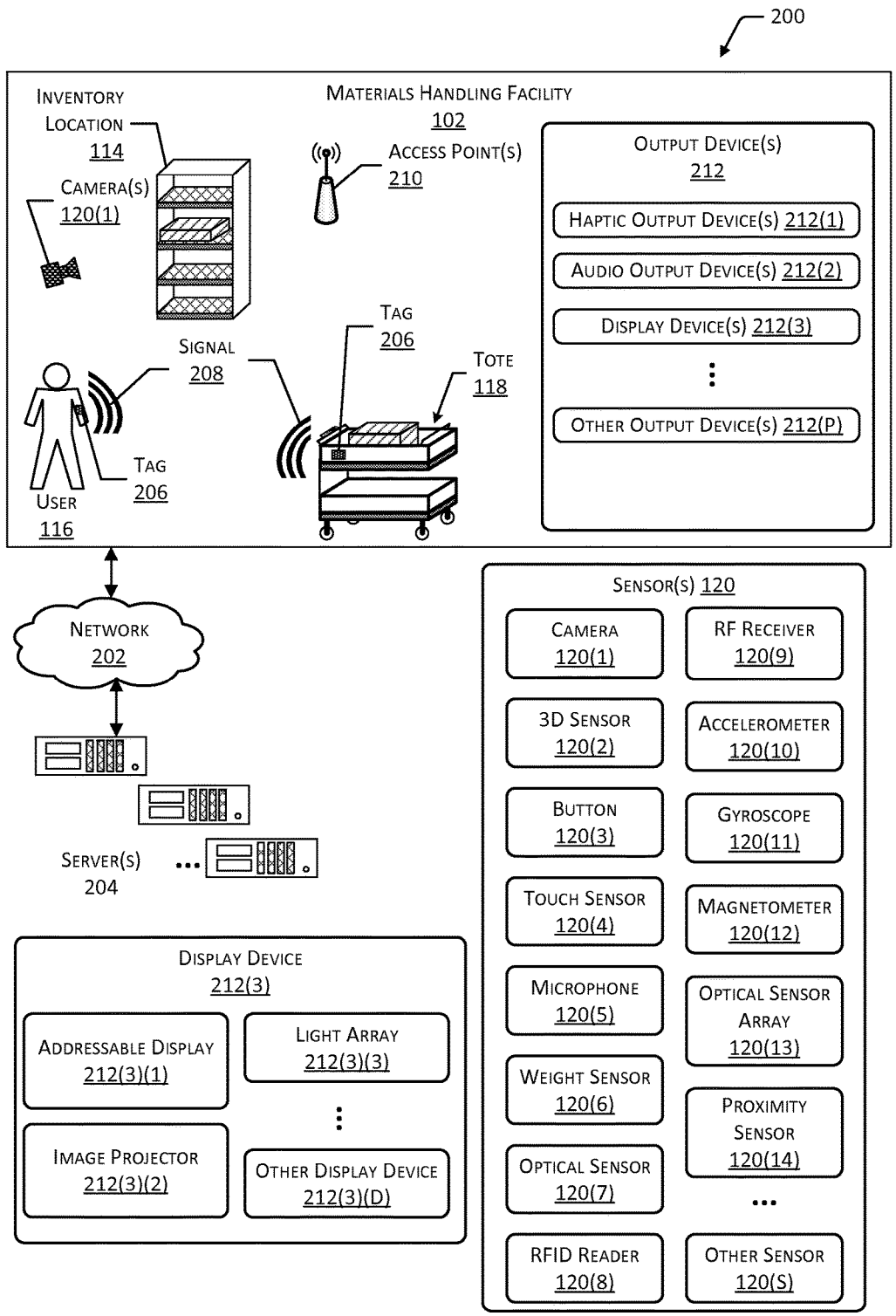
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks such as an institutional or personal intranet, public networks such as the Internet, or a combination thereof. The network 202 may utilize wired technologies (e.g., wires, fiber optic cables, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite, and so forth), or other connection technologies.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 may be configured to emit a signal 208. In one implementation, the tag 206 may be a radio frequency identification (RFID) tag 206 configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth® Low Energy (BLE) transmitter and battery. In other implementations, the tag 206 may use other techniques to indicate presence of the tag 206. For example, an acoustic tag 206 may be configured to generate an ultrasonic signal 208, which is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, which may be read and, based at least in part on signal strength, used to determine identity and location.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on a tote 118, may be carried or worn by a user 116, and so forth.

The sensors 120 may include one or more cameras 120(1) or other imaging sensors. The one or more cameras 120(1) may include imaging sensors configured to acquire images of a scene. The cameras 120(1) are configured to detect light in one or more wavelengths including, but not limited to, terahertz, infrared, visible, ultraviolet, and so forth. The cameras 120(1) may comprise charge coupled devices (CCD), complementary metal oxide semiconductor (CMOS) devices, microbolometers, and so forth. The inventory management system 122 may use image data acquired by the cameras 120(1) during operation of the facility 102. For example, the inventory management system 122 may identify items 104, users 116, totes 118, and so forth, based at least in part on their appearance within the image data acquired by the cameras 120(1). The cameras 120(1) may be mounted in various locations within the facility 102. For example, cameras 120(1) may be mounted overhead, on inventory locations 114, may be worn or carried by users 116, may be affixed to totes 118, and so forth.

One or more 3D sensors 120(2) may also be included in the sensors 120. The 3D sensors 120(2) are configured to acquire spatial or 3D data, such as depth information, about objects within a FOV 130 of a sensor 120. The 3D sensors 120(2) may include range cameras, lidar systems, sonar systems, radar systems, structured light systems, stereo vision systems, optical interferometry systems, and so forth. The inventory management system 122 may use the 3D data acquired by the 3D sensors 120(2) to identify objects, determine a location of an object in 3D real space, and so forth.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) to accept input from the user 116 and send information indicative of the input to the inventory management system 122.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking, enter a manual count of items 104 at an inventory location 114, and so forth.

One or more microphones 120(5) may be configured to acquire information indicative of sound present in the environment. In some implementations, arrays of microphones 120(5) may be used. These arrays may implement beamforming techniques to provide for directionality of gain. The inventory management system 122 may use the one or more microphones 120(5) to acquire information from acoustic tags 206, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, on the floor of the facility 102, and so forth. The weight sensors 120(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 120(6) may operate as transducers that generate one or more signals based on an applied force, such as that of the load due to gravity. For example, the weight sensor 120(6) may comprise a load cell having a strain gauge and a structural member that deforms slightly when weight is applied. By measuring a change in the electrical characteristic of the strain gauge, such as capacitance or resistance, the weight may be determined. The inventory management system 122 may use the data acquired by the weight sensors 120(6) to identify an object, determine a change in the quantity of objects, determine a location of an object, maintain shipping records, and so forth.

The sensors 120 may include one or more optical sensors 120(7). The optical sensors 120(7) may be configured to provide data indicative of one or more of color or intensity of light impinging thereupon. For example, the optical sensor 120(7) may comprise a photodiode and associated circuitry configured to generate a signal or data indicative of an incident flux of photons. As described below, the optical sensor array 120(13) may comprise a plurality of the optical sensors 120(7). For example, the optical sensor 120(7) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 120(7) may be used. The optical sensors 120(7) may be sensitive to one or more of infrared light, visible light, or ultraviolet light. For example, the optical sensors 120(7) may be sensitive to infrared light, and infrared light sources such as LEDs may provide illumination.

The optical sensors 120(7) may include photodiodes, photoresistors, photovoltaic cells, quantum dot photoconductors, bolometers, pyroelectric infrared detectors, and so forth. For example, the optical sensor 120(7) may use germanium photodiodes to detect infrared light.

One or more radio frequency identification (RFID) readers 120(8), near field communication (NFC) systems, and so forth, may be included as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8) detecting the RF tag 206 at different times and RFID readers 120(8) having different locations in the facility 102, a velocity of the RF tag 206 may be determined.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi®, Bluetooth®, ZigBee®, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) may provide information indicative of rotation of an object affixed thereto. For example, the tote 118 or other objects may be equipped with a gyroscope 120(11) to provide data indicative of a change in orientation of the object.

A magnetometer 120(12) may be used to determine an orientation by measuring ambient magnetic fields, such as the terrestrial magnetic field. The magnetometer 120(12) may be worn or carried by the user 116, mounted to the tote 118, and so forth. For example, the magnetometer 120(12) mounted to the tote 118 may act as a compass and provide information indicative of which direction the tote 118 is oriented.

As described above, the optical sensor array 120(13) may comprise one or optical sensors 120(7). The optical sensors 120(7) may be arranged in a regular, repeating, or periodic two-dimensional arrangement such as a grid. The optical sensor array 120(13) may generate image data.

The sensors 120 may include proximity sensors 120(14) used to determine presence of an object, such as the user 116, the tote 118, and so forth. The proximity sensors 120(14) may use optical, electrical, ultrasonic, electromagnetic, or other techniques to determine a presence of an object. In some implementations, the proximity sensors 120(14) may use an optical emitter and an optical detector to determine proximity. For example, an optical emitter may emit light, a portion of which may then be reflected by the object back to the optical detector to provide an indication that the object is proximate to the proximity sensor 120(14). In other implementations, the proximity sensors 120(14) may comprise a capacitive proximity sensor 120(14) configured to provide an electrical field and determine a change in electrical capacitance due to presence or absence of an object within the electrical field.

The proximity sensors 120(14) may be configured to provide sensor data indicative of one or more of a presence or absence of an object, a distance to the object, or characteristics of the object. An optical proximity sensor 120(14) may use time-of-flight (ToF), structured light, interferometry, or other techniques to generate distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor such as a camera 120(1). Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth.

In some implementations, a proximity sensor 120(14) may be installed at the inventory location 114. The non-weight data 128 generated by the proximity sensor 120(14) may be used in conjunction with the weight data 126 as described in this disclosure. For example, the optical proximity sensor 120(14) may determine that the user 116 is within a threshold distance of an inventory location 114. Based on this non-weight data 128, the inventory management system 122 may generate activity data indicative of that presence. By using the activity data, the inventory management system 122 may determine that the weight data 126 is reliable and subsequently use changes in the weight data 126 to change the item data 136 indicative of a quantity on hand.

The sensors 120 may include other sensors 120(5) as well. For example, the other sensors 120(5) may include light curtains, ultrasonic rangefinders, thermometers, barometric sensors, hygrometers, biometric input devices including, but not limited to, fingerprint readers or palm scanners, and so forth. For example, the inventory management system 122 may use information acquired from thermometers and hygrometers in the facility 102 to direct the user 116 to check on delicate items 104 stored in a particular inventory location 114, which is overheating, too dry, too damp, and so forth.

In one implementation, the light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the inventory location 114, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 116 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 116 and the sheet of infrared light. In some implementations, a pair of light curtains may be arranged at right angles relative to one another to provide two-dimensional touchpoint data indicative of a position of touch in a plane.

The sensors 120(5) may also include an instrumented auto-facing unit (AFU). The instrumented AFU may comprise a position sensor configured to provide data indicative of displacement of a pusher. As an item 104 is removed from the AFU, the pusher moves, such as under the influence of a spring, and pushes the remaining items 104 in the AFU to the front of the inventory location 114. By using data from the position sensor, and given item data 136 such as a depth of an individual item 104, a count may be determined, based on a change in position data. For example, if each item 104 is 1 inch deep, and the position data indicates a change of 3 inches, the quantity held by the AFU may have changed by 3 items 104.

In some implementations, the camera 120(1) or other sensors 120 may include hardware processors, memory, and other elements configured to perform various functions. For example, the cameras 120(1) may be configured to generate image data, send the image data to another device such as the server 204, and so forth.

The facility 102 may include one or more access points 210 configured to establish one or more wireless networks. The access points 210 may use Wi-Fi®, NFC, Bluetooth®, or other technologies to establish wireless communications between a device and the network 202. The wireless networks allow the devices to communicate with one or more of the sensors 120, the inventory management system 122, the optical sensor arrays 120(13), the tag 206, a communication device of the tote 118, or other devices.

Output devices 212 may also be provided in the facility 102. The output devices 212 are configured to generate signals, which may be perceived by the user 116 or detected by the sensors 120. In some implementations, the output devices 212 may be used to provide illumination of the optical sensor array 120(13).

Haptic output devices 212(1) are configured to provide a signal that results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal, which produces an apparent tactile sensation in one or more fingers of the user 116. In another example, the haptic output devices 212(1) may comprise piezoelectric or rotary motor devices configured to provide a vibration, which may be felt by the user 116.

One or more audio output devices 212(2) may be configured to provide acoustic output. The acoustic output includes one or more of infrasonic sound, audible sound, or ultrasonic sound. The audio output devices 212(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 212(3) may be configured to provide output, which may be seen by the user 116 or detected by a light-sensitive sensor such as a camera 120(1) or an optical sensor 120(7). In some implementations, the display devices 212(3) may be configured to produce output in one or more of infrared, visible, or ultraviolet light. The output may be monochrome or color.

The display devices 212(3) may be emissive, reflective, or both. An emissive display device 212(3), such as using LEDs, is configured to emit light during operation. In comparison, a reflective display device 212(3), such as using an electrophoretic element, relies on ambient light to present an image. Backlights or front lights may be used to illuminate non-emissive display devices 212(3) to provide visibility of the output in conditions where the ambient light levels are low.

The display devices 212(3) may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display device 212(3) may use a light source and an array of MEMS-controlled mirrors to selectively direct light from the light source to produce an image. These display mechanisms may be configured to emit light, modulate incident light emitted from another source, or both. The display devices 212(3) may operate as panels, projectors, and so forth.

The display devices 212(3) may be configured to present images. For example, the display device 212(3) may comprise an addressable display 212(3)(1). The addressable display 212(3)(1) may comprise elements that may be independently addressable to produce output, such as pixels. For example, the addressable display 212(3)(1) may produce an image using a two-dimensional array of pixels.

In some implementations, the display devices 212(3) may be configured to provide non-image data, such as text characters, colors, and so forth. For example, an addressable display 212(3)(1) may comprise a segmented electrophoretic display device 212(3), segmented LED, and so forth, and may be used to present information such as a stock keeping unit (SKU) number, quantity on hand, and so forth. The display devices 212(3) may also be configurable to vary the color of the segment, such as using multicolor/multi-wavelength LED segments.

The display devices 212(3) may include image projectors 212(3)(2). For example, the image projector 212(3)(2) may be configured to project an image onto objects, illuminate at least a portion of an optical sensor array 120(13), and so forth. The image may be generated using MEMS, LCOS, lasers, and so forth.

The display devices 212(3) may include a light array 212(3)(3). The light array 212(3)(3) may comprise a plurality of discrete emissive elements configurable to emit light. The discrete emissive elements (or assemblies thereof) may be separated from one another by a distance such that, when image data of the light array 212(3)(3) is acquired, one emissive element may be distinguished from another. For example, the light array 212(3)(3) may comprise a plurality of infrared LEDs separated by at least 0.5 centimeters.

Other display devices 212(3)(D) may also be used in the facility 102. The display devices 212(3) may be located at various points within the facility 102. For example, the addressable displays 212(3)(1) or the light arrays 212(3)(3) may be located on inventory locations 114, totes 118, in or on the floor of the facility 102, and so forth.

Other output devices 212(P) may also be present. For example, the other output devices 212(P) may include scent/odor dispensers, document printers, 3D printers or fabrication equipment, and so forth.

Figure 3:
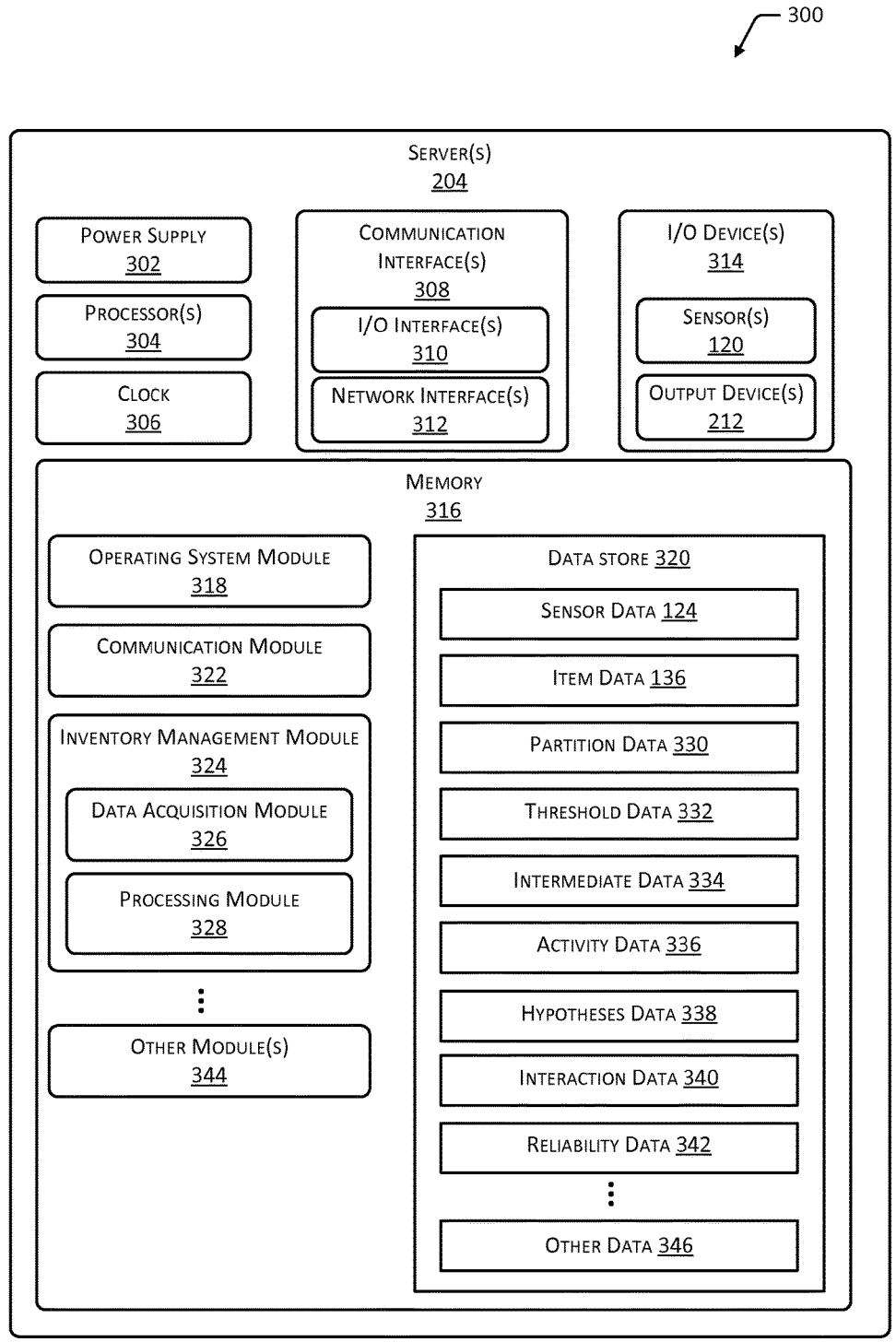
FIG. 3 is a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 may be configured to provide electrical power suitable for operating the components in the server 204. The one or more power supplies 302 may comprise batteries, capacitors, fuel cells, photovoltaic cells, wireless power receivers, conductive couplings suitable for attachment to an external power source such as provided by an electric utility, and so forth. The server 204 may include one or more hardware processors 304 (processors) configured to execute one or more stored instructions. The processors 304 may comprise one or more cores. One or more clocks 306 may provide information indicative of date, time, ticks, and so forth. For example, the processor 304 may use data from the clock 306 to associate a particular interaction with a particular point in time.

The server 204 may include one or more communication interfaces 308 such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 212 such as one or more of a display device 212(3), printer, audio speakers, and so forth. In some embodiments, the I/O devices 314 may be physically incorporated with the server 204 or may be externally placed.

The network interfaces 312 may be configured to provide communications between the server 204 and other devices, such as the totes 118, routers, access points 210, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi®, Bluetooth®, ZigBee®, and so forth.

The server 204 may also include one or more busses or other internal communications hardware or software that allow for the transfer of data between the various modules and components of the server 204.

As shown in FIG. 3, the server 204 includes one or more memories 316. The memory 316 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the server 204. A few example functional modules are shown stored in the memory 316, although the same functionality may alternatively be implemented in hardware, firmware, or as a system on a chip (SOC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, sensors 120, display devices 212(3), other servers 204, or other devices. The communications may be authenticated, encrypted, and so forth.

The memory 316 may store an inventory management module 324. The inventory management module 324 is configured to provide the inventory functions as described herein with regard to the inventory management system 122. For example, the inventory management module 324 may track items 104 between different inventory locations 114, to and from the totes 118, and so forth.

The inventory management module 324 may include one or more of a data acquisition module 326 or a processing module 328. The data acquisition module 326 may be configured to acquire and access information associated with operation of the facility 102. For example, the data acquisition module 326 may be configured to acquire sensor data 124 from one or more of the sensors 120. This information may be stored in the data store 320 as part of the sensor data.

The processing module 328 may be configured to use one or more of sensor data 124, item data 136, partition data 330, threshold data 332, or other information to generate intermediate data 334. One or more of the sensor data 124 or the intermediate data 334 may be used to generate activity data 336. From the activity data 336, one or more hypotheses of the hypotheses data 338 may be selected.

The threshold data 332 may comprise one or more thresholds associated with operation of the processing module 328. For example, the threshold data 332 may specify a tolerance or accepted extent of deviation permitted between a hypothesis and the observed sensor data 124. In another example, the threshold data 332 may include a threshold indicating a minimum count of pixels that, if different, designate a change has occurred in image data. The threshold data 332 may include other thresholds, such as an interaction threshold period, and so forth. In some implementations, the threshold data 332 may include constraint data, such as described below that may be used to constrain the hypotheses data 338.

The hypotheses data 338 may comprise the predicted values for weight characteristics for different combinations of variables that may affect weight characteristic data. The variables may include quantities of items 104, placement within partitioned areas 134 of a particular inventory location 114, and so forth. The hypotheses data 338 may be at least partially precomputed given the item data 136 indicating what items 104 are intended to be stored in the particular partitioned areas 134 of the inventory location 114.

The hypotheses data 338 may comprise a data structure with information such as:
- Hypothesis 1=Quantity of 2 cans of pet food SKU #12345 removed from partitioned area 134(1) exhibits a COM change from a distance (relative to an origin) of 14 cm to a distance of 10 cm, and a change in weight of 910 grams.
- Hypothesis 2=Quantity of 1 can of pet food SKU #12345 removed from partitioned area 134(1) and quantity of 1 can of pet food SKU #67890 removed from partitioned area 134(2) exhibits a COM change from a distance (relative to an origin) of 14 cm to a distance of 10 cm, and a change in weight of 905 grams.
- Hypothesis 3=Quantity of 1 box of pet food SKU #88771 removed from partitioned area 134(3) exhibits a COM change from a distance (relative to an origin) of 19 cm to a distance of 15 cm, and a change in weight of 505 grams.

In some implementations, the hypotheses data 338 may be constrained. For example, the hypotheses data 338 may exclude situations such as a simultaneous pick and place in the same interaction, simultaneous removal from different partitioned areas 134, interactions involving a minimum or maximum number of items 104, and so forth. Continuing the example, constraint data may be specified that limits the hypotheses data 338 to those hypotheses that do not have predicted quantities that exceed the stowage capacity of the inventory location 114, the partitioned area 134, and so forth. For example, the constraint data may be used to limit the hypotheses that are generated or included in the hypotheses data 338. In other implementations, the constraint data may be used to disregard particular hypotheses present in the hypotheses data 338 from further consideration. For example, a hypothesis having a predicted value or a value based on a predicated value that exceeds a threshold specified by the constraint data may be disregarded and not used to determine a solution.

By using the sensor data 124, a particular hypothesis may be selected from the hypotheses data 338 and deemed to be true or accurate given the information available. The information from the selected hypothesis may then be used to generate interaction data 340. This interaction data 340 may be used to change item data 136, track objects, and so forth. For example, based on the weight data 126 indicating a change in COM from 13 cm to 9 cm and a weight change of 905 grams, hypotheses 1 or 2 may be correct, within the tolerance of error specified by the threshold data 332. Hypothesis 3 is discarded as it exhibits a change in COM and a change in weight that are beyond the tolerance of error. To disambiguate between hypotheses 1 and 2, the processing module 328 may use the non-weight data 128 to determine that activity occurred at both the partitioned area 134(1) and 134(2). Hypothesis 2 may be discarded, and hypothesis 1 may be deemed to be correct. The interaction data 340 generated may then indicate that 2 cans of pet food having SKU #12345 were removed from the partitioned area 134(1). The quantity on hand at that partitioned area 134(1) may be decreased accordingly, and the quantity determined to be in possession of the user 116 may be increased accordingly.

The processing module 328 may generate reliability data 342 indicative of the reliability of weight data 126 using activity data that is based on non-weight data 128. For example, the reliability data 342 may indicate that the weight data 126 is unreliable when no activity at the inventory location 114 is detected. As a result, erroneous data is not processed, preventing incorrect changes in quantity on hand, or other effects. The reliability data 342 may be expressed as a binary value, such as a logical "yes" or "true", logical "no" or "false", and so forth. For example, the reliability data 342 may be stored as a single bit with "0" indicative of unreliable data and "1" indicative of reliable data.

In some implementations, the reliability data 342 may include data indicative of a probability. For example, the reliability data 342 may indicate a probability the weight data 126 is reliable, such as "0.95".

Operation of the processing module 328 and the various data involved including the intermediate data 334, activity data 336, hypotheses data 338, reliability data 342, and so forth, is discussed in more detail below.

Processing of the sensor data 124, intermediate data 334, or other data may be performed by the processing module 328 or other modules implementing, at least in part, one or more of the following tools or techniques. In one implementation, processing described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 124.

Techniques such as artificial neural networks (ANN), active appearance models (AAM), active shape models (ASM), principal component analysis (PCA), cascade classifiers, and so forth, may also be used to process the sensor data 124, the intermediate data 334, the activity data 336, or other data. For example, the ANN may be a trained using a supervised learning algorithm such that object identifiers are associated with images of particular objects within training images provided to the ANN. Once trained, the ANN may be provided with the sensor data 124 such as the non-weight data 128 comprising image data from a camera 120(1), and so forth, and may provide, as output, the object identifier. In another example, cascade classifiers may be used for facial recognition, such as the Viola and Jones face detection.

The processing module 328 may process the image data using one or more machine vision counting techniques to determine a count of the items 104 at the partitioned area 134. For example, machine vision counting techniques may be configured to identify a top portion of the items 104 as acquired from a camera 120(1) that is looking down on the shelf holding the items 104. This determination may be based on item data 136, such as previously acquired images of a sampled item 104. Each of the tops of the type of item 104 appearing in a frame may be identified, and a count made. A change in the count using image data obtained at a first time relative to a count using image data obtained at a second time, a change in the count may be determined.

In another implementation, an indicia on the inventory location 114 may be observed. For example, a ruler or other markings may be printed on the surface of the inventory location 114. Instead of, or in addition to, identifying the individual items 104, a change in the observed indicia may be determined and used to count. Continuing the example, the frame may include a portion of a ruler printed on the shelf. The length of the ruler visible in a frame may be determined. Given the length visible (or a change therein) and given information about a dimension of the type of item 104 (such as the depth), a count may be calculated.

A difference in the counts between the first image and the second image may be determined. For example, the first image may result in a count of 10 cans of pet food while the second image may result in a count of 8 cans of pet food. A hypothesis that 2 cans were removed may be determined, along with a probability that this hypothesis is accurate.

Other modules 344 may also be present in the memory 316 as well as other data 346 in the data store 320. For example, the other modules 344 may include an accounting module while the other data 346 may include billing data. The accounting module may be configured to assess charges to accounts associated with particular users 116 or other entities, while the billing data may include information such as payment account numbers.

Figure 4:
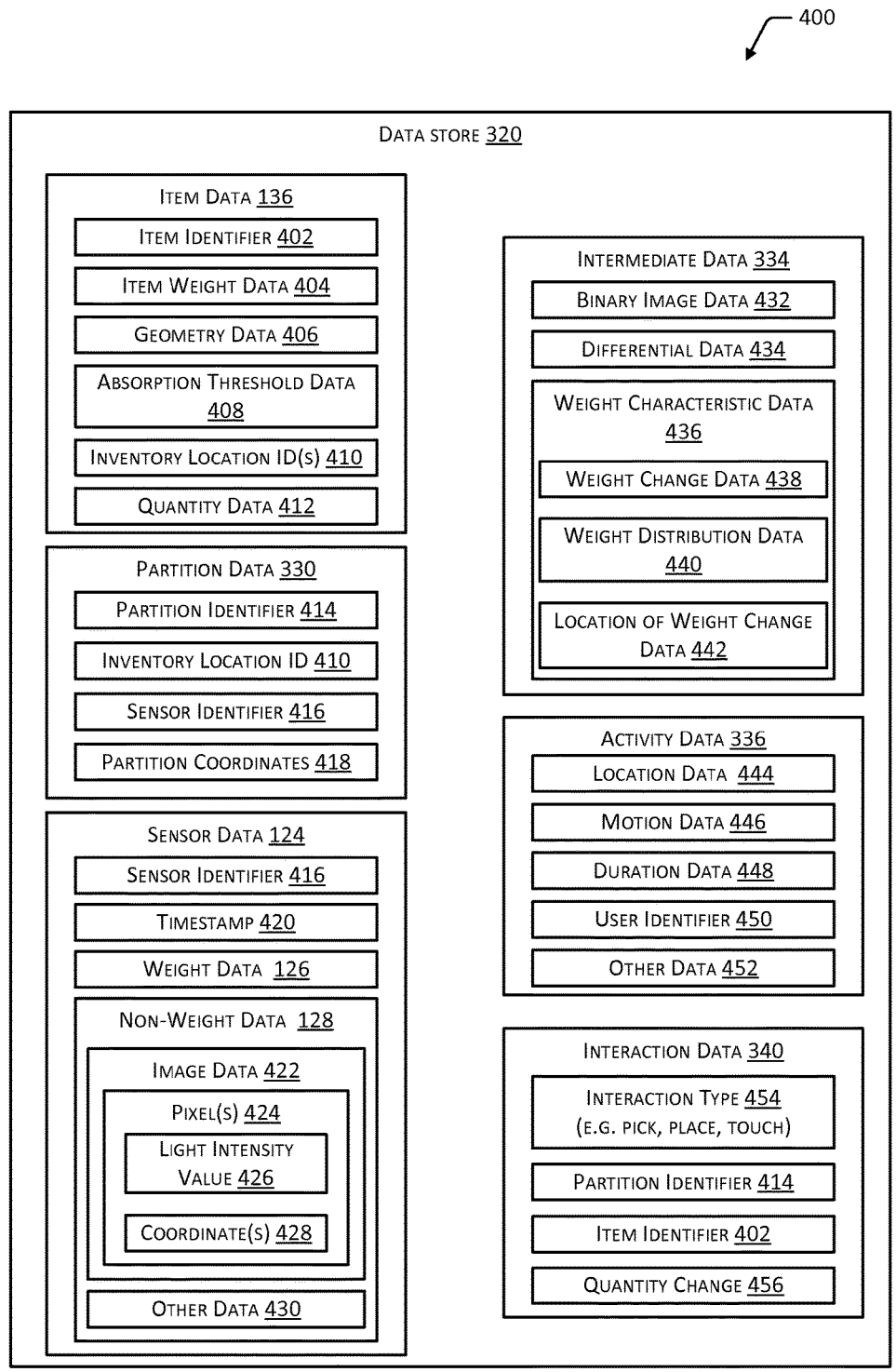
FIG. 4 is a block diagram of additional data that may be used by the server to support operation of the facility, according to some implementations.

FIG. 4 is a block diagram 400 of additional data that may be used by the server 204 to support operation of the facility 102, according to some implementations. This data may be stored at least in part by the data store 320. As described above with regard to FIG. 3, the inventory management module 324 may use the sensor data 124 to generate other information such as interaction data 340 indicative of what item 104 a user 116 has interacted with.

The processing module 328 may access item data 136. The item data 136 may include an item identifier 402. The item identifier 402 may be used to distinguish one item 104 from another. For example, the item identifier 402 may include a SKU, Universal Product Code (UPC) number, and so forth. The items 104 that are of the same type may be referred to by the same item identifier 402. For example, 450 gram cans of dog food may be represented by the item identifier 402 value of "9811901181". In other implementations, non-fungible items 104 may each be provided with a unique item identifier allowing each to be distinguished from one another.

The item data 136 may include one or more of item weight data 404, geometry data 406, or absorption threshold data 408. The item weight data 404 comprises information indicative of a weight of the item 104, package, kit, or other grouping considered to be a single item 104. The geometry data 406 may comprise information indicative of an area of a shadow 132 of the item 104, within an image of the item 104 acquired by a camera 120(1), and so forth. For example, the geometry data 406 may comprise an area as measured in pixels, square centimeters, and so forth. The geometry data 406 may be for a single item 104, or a package or kit of objects considered to be a single item 104.

The geometry data 406 may also comprise information indicative of the shape of the item 104, such as in the shadow 132, an image acquired from a camera 120(1), and so forth. The geometry data 406 may comprise information indicative of one or more contours of the item 104. For example, the geometry data 406 may comprise information indicating that the shadow 132 of the item 104 is a rectangle measuring three pixels by seven pixels.

The absorption threshold data 408 provides information indicative of how transparent the item 104 is to the light detected by the optical sensor array 120(13). For example, the absorption threshold data 408 may comprise a $75^{th}$ percentile value of the light intensity values of the pixels that are within a contour of the shadow 132 of the single item 104. The absorption threshold data 408 may be used to generate intermediate data 334, such as binary image data described below. Generation of the absorption threshold data 408 is discussed below in more detail.

The item data 136 may include one or more inventory location identifiers (IDs) 410. The inventory location IDs 410 are indicative of a particular inventory location 114 that is designated for stowage of the item 104. The item data 136 may also include quantity data 412. The quantity data 412 may comprise a count or value indicative of a number of items 104. The count may be a measured or estimated value. The quantity data 412 may be associated with a particular inventory location ID 410, such as when the same item 104 is stowed at several different inventory locations 114, or in a particular partitioned area 134. In other implementations, the item data 136 may include other data, such as an image of the item 104.

The partition data 330 may include one or more of a partition identifier 414, inventory location ID 410, a sensor identifier 416, or partition coordinates 418. As described above, a single inventory location 114 with an optical sensor array 120(13) may stow several different kinds of items 104, with each item 104 being associated with a different item identifier 402. For example, the optical sensor array 120(13) may be incorporated into a shelf of the inventory location 114. Three different items 104(1), 104(2), and 104(3) may be stored on that same shelf serviced by a single optical sensor array 120(13), with each item 104 in a partitioned area 134(1), 134(2), 134(3), respectively.

The partition identifier 414 comprises data indicative of a particular partitioned area 132. The partition identifier 414 may be unique in the context of a particular inventory location 114, aisle 112, facility 102, or globally across multiple facilities 102. The inventory location ID 410 included in the partition data 330 may associate the particular partition identifier 414 with a particular inventory location 114. The particular inventory location 114 may then be associated with the item identifier 402 indicative of the items 104 stored therein.

The sensor identifier 416 comprises data indicative of a particular sensor 120, such as a certain camera 120(1), optical sensor array 120(13), proximity sensor 120(14), and so forth. The sensor identifier 416 may be unique in the context of a particular inventory location 114, aisle 112, facility 102, or globally across multiple facilities 102.

The partition coordinates 418 may specify an area that encompasses the partitioned area 134. For example, the partition coordinates 418 may specify two or more of corners of a rectangular partitioned area 134, a distance relative to an origin, and so forth.

The sensor data 124 may be generated or acquired by one or more of the sensors 120. The sensor data 124 may include one or more of the sensor identifiers 416, a timestamp 420, weight data 126, or non-weight data 128. The timestamp 420 may comprise information indicative of a time when the sensor data 124 was acquired. For example, the timestamp 420 may be based at least in part on time data obtained from a clock onboard the sensor 120, by the clock 306 on the server 204, and so forth. The inventory management module 324 may use the timestamp 420 to associate weight data 126 with non-weight data 128 and a corresponding time.

As described above, the sensor data 124 may be broadly categorized as comprising weight data 126 and non-weight data 128. For example, the weight data 126 may comprise information obtained from one or more of the weight sensors 120(6). Conversely, the non-weight data 126 may comprise information obtained from the sensors 120 other than the weight sensors 120(6).

In some implementations, the non-weight data 128 may comprise image data 422. The image data 422 may be obtained from one or more sensors 120, such as a camera 120(1), a 3D sensor 120(2), or optical sensor array 120(13). The image data 422 may comprise one or more pixels 424.

In the implementation where the image data 422 is provided by an optical sensor array 120(13), the pixels 424 may comprise data acquired from one or more of the optical sensors 120(7). For example, a single optical sensor 120(7) may be represented by a single pixel 424. Each pixel 424 may include information indicative of a light intensity value 426. The light intensity value 426 provides information indicative of a flux of light impinging upon the optical sensor 120(7) at a particular time. For example, the light intensity value 426 may comprise an 8 or 16-bit value produced by the optical sensor 120(7). The pixel 424 may also include information indicative of a coordinate 428 or relative position of the pixel 424 with respect to other pixels 424 or an origin point. For example, the coordinates 428 may indicate that a particular pixel 424 is at an intersection of a particular row and column. The coordinates 428 may express a relative position within the two-dimensional arrangement of the optical sensor array 120(13). In one implementation, the image data 422 may be represented as a two-dimensional matrix.

In some implementations, the pixels 424 may also include color or spectral data. For example, each pixel 424 may have a plurality of light intensity values 426, with each of the light intensity values 426 indicative of an intensity of a different wavelength or range of wavelengths of light.

The sensor data 124 may include other data 430. For example, information indicative of operational status of the sensor 120, error messages associated with the sensor 120, and so forth.

The processing module 328 may access the item data 136, the partition data 330, and the sensor data 124 to generate intermediate data 334. For example, the processing module 328 may access threshold data 332 and generate binary image data 432 from the image data 422.

The threshold data 332 may include a binary image threshold value used to distinguish whether a pixel 424 in the resulting binary image data 432 will be designated as a binary "0" value or binary "1" value. For example, the binary image data 432 may be generated by comparing the light intensity value 426 of each pixel 424 with a threshold value. In this example, the threshold value may be an 8-bit value of "50". The pixels 424 having light intensity value 426 below 50 may result in a pixel 424 in the binary image data 432 having a binary value of "1". In other implementations, the opposite values may be used, such as values below the threshold value being assigned a binary value of "0".

By thresholding in this fashion, the resulting binary image data 432 may be more easily processed to determine characteristics such as shape, area, perimeter, edges, or contours. For example, the OpenCV function "threshold" may be used to generate the binary image data 432. In other implementations, other thresholding techniques may be used.

The processing module 328 may be configured to generate contour data using the binary image data 432. The contour data may provide information indicative of a shape having a closed or complete perimeter. In some implementations, the contour data may be indicative of a curve or open perimeter. For example, an edge appearing in the shadow 132 may be incomplete. This may occur due to an optical anomaly, erroneous reading by an optical sensor 120(7), and so forth. The processing module 328 may be configured to close an open perimeter.

The contour data may comprise the coordinates 428 of the pixels 424 within the binary image data 432 having a binary value of "1" or "0". In other implementations, the contour data may comprise a vector value, matrix of values, or other information representative of the perimeter of a shadow 132. For example, the OpenCV function "FindContours" may be used to generate the contour data. Other functions may be used to generate the contour data. For example, the OpenCV function "contourArea" may be used to process the binary image data 432 to generate the geometry data 406. The geometry data 406 may be indicated in terms of pixels, units of linear measurement, and so forth.

In some implementations, the binary image data 432 may be further processed to reduce noise, simplify later processing, and so forth. For example, an erosion function may be applied to the binary image data 432. In one implementation, where the contour is represented by binary "1" s, in the binary image data 432, the erosion function may be configured to set to a value of "0" to those pixels 424 adjacent to, but not part of, a contour. For example, the OpenCV function "erode" may be used. In some implementations, the erosion may use a 1 pixel neighborhood boundary. Second binary image data 432 may be generated as a result of this processing, or the original binary image data 432 may be modified.

The intermediate data 334 may also comprise differential data 434. The differential data 434 may result from a comparison between image data 422 at different times and may be indicative of a change or difference when one occurs. For example, the differential data 434 may comprise a value indicating that the particular image data 422 has changed relative to earlier image data 422. The differential data 434 may simplify processing by removing "background" such as those items 104 that were left untouched.

The differential data 434 may comprise one or more differential images. The differential images may result from comparison of one binary image from another, one sensor image from another, and so forth. In one implementation, a first image sensor data 124(1) may be subtracted from a second image sensor data 124(2). For example, the light intensity values 426 of a pixel 424 in the first image sensor data 124(1) may be subtracted from a corresponding pixel 424 at the same coordinates in the second image sensor data 124(2). The subtraction may be accomplished using the "cvSub( )" function of OpenCV.

The extent of change between the first image data 422(1) and the second image data 422(2) may be quantified by assessment of the differential image. In one implementation, pixels 424 in the differential image having a non-zero light intensity value 426 are those that exhibited a change. These pixels 424 in the differential image may be counted, a contour determined from the pixels 424, and so forth.

The processing module 328 may use the differential image or data about the differential image to determine a state of the image data 422 at a particular time. The image data 422 may be deemed to be "stable" when the number of changes for a particular period of time is below a threshold value in the threshold data 332. Similarly, the image data 422 may be deemed to be "unstable" when the number of changes for the particular period of time is greater than or equal to the threshold value. For example, the threshold value in terms of a number of non-zero pixels 424 in the differential image may be 2 pixels 424. Continuing the example, differential images having one or fewer pixels 424 may be deemed to indicate a stable state of the latest image data 422 obtained. As described below, information about whether the image data 422 is in a stable or unstable state may be used to distinguish a measured interaction from noise.

The processing module 328 may also generate intermediate data 334 such as an interaction duration. The interaction duration may indicate a length of time the image data 422 was deemed to be in an unstable state. For example, the interaction duration may be the time elapsed between the end of a first stable state and the beginning of a second stable state. In some implementations, the processing module 328 may use an interaction threshold period stored in the threshold data 332 to prevent transient signals from generating interaction data 340. For example, the interaction threshold period may be 500 ms. Image data 422 for which the unstable state is greater than 500 ms may be processed and subsequently result in the generation of interaction data 340. In comparison, image data 422 having an unstable state that is less than 500 ms in duration may be disregarded as noise.

Intermediate data 334 may also include weight characteristic data 436. The weight characteristic data 436 may be generated by processing the weight data 126. The weight characteristic data 436 may include weight change data 438, weight distribution data 440, location of weight change (LWC) data 442, or other data.

The weight change data 438 is indicative of a change in weight measured by one or more of the weight sensors 120(6) from a first time to a second time. For example, calculation of the weight change data 438 may comprise subtracting a first weight obtained at a first time from the second weight obtained and the second time. In some implementations, the inventory management module 324 may determine the weight change data 438. In other implementations, the determination of the weight change data 438 may be performed at least partially on board the weight sensor 120(6) or an associated device such as a controller.

The weight distribution data 440 may provide data indicative of weight distribution at a particular time as measured by one or more of the weight sensors 120(6). For example, the weight distribution data 440 for a configuration in which a rectangular shelf has a weight sensor 120(6) at each of the four corners may have weight distribution data 440 corresponding to each of the corners. In another example, data from weight sensors 120(6) may be combined, such as to provide a weight measured at a left side of the inventory location 114 and a weight measured at a right side of the inventory location 114.

The weight distribution data 440 may be expressed as a measured weight at a particular weight sensor 120(6), a ratio or percentage of weight on a weight sensor 120(6), and so forth. For example, the weight distribution data 440 may be expressed as "3213 g left, 2214 g right", as a dimensionless ratio such as "0.59 left, 0.41 right", and so forth.

The inventory management module 324 may determine the weight distribution data 440. Alternatively, the determination of the weight distribution data 440 may be performed at least partially on board the weight sensor 120(6) or an associated device such as a controller. In some implementations, the weight distribution data 440 may indicate a change in the weight distribution from a first time to a second time.

The weight distribution data 440 may provide data indicative of center-of-mass (COM) at a particular time. For example, the weight distribution data 440 may indicate a COM, change in the COM from a first time to a second time, and so forth. A variety of techniques may be used to calculate the COM or center-of-gravity. The COM may be described as the point in space at which weighted position vectors relative to this point sum to zero. For example, the COM of a sphere is a point in the center of the sphere. In another example, the COM of a toroid is a point in the center of the toroid. Consider a simple system having two masses m1 and m2, arranged along a single axis "x" at positions x1 and x2, respectively. The position of each mass is given as a distance "x" relative to an origin. The COM may be expressed by the equation:

$$x=((m1*x1)+(m2x2))/(m1+m2) \qquad \text{Equation 1}$$

The physical characteristics of the inventory location 114, placement of the weight sensors 120(6) at the inventory location 114, physical position of the partitioned area 134 relative to the inventory location 114, quantity and weight of the items 104 at the respective partitioned area 134, and so forth, are known. For example, given the physical design of the inventory location 114, it may be known that a weight sensor 120(6) is positioned at each of the four corners of a shelf, and that the shelf has a particular length and width. Continuing the example, the physical coordinates corresponding to the partitioned area 134 on that shelf are known. Using this information, as well as the item data 136, weight characteristic data 436 may be generated for an inventory location 114 before, during, or after an interaction.

The location of weight change (LWC) data 442 provides information indicative of the location, with respect to the inventory location 114, at which a weight change has taken place. For example, the LWC data 442 may indicate that a weight change has taken place at 15 cm from the origin of the inventory location 114. The LWC data 442 may be determined using the weight data 126. For example, the LWC data 442 may be calculated from the weight distribution data 440.

In some implementations, the LWC data 442 may be expressed as a vector value having a direction and a magnitude. For example, the LWC data 442 may comprise a vector having a first endpoint at an origin of the inventory location 114 and a second endpoint at the location of the weight change.

In one implementation, the LWC data 442 may be determined as follows. Assume a situation wherein the inventory location 114 comprises a shelf having a width "a", a left weight sensor 120(6) located at a distance "b" from the left edge of the shelf, and a right weight sensor 120(6) located at a distance "b" from the right edge of the shelf. The weight measured by the left weight sensor 120(6) is "w1", and the weight measured by the right weight sensor 120(6) is "w2". A distance "LWC" indicative of the location of weight change from an origin at the leftmost edge of the shelf may be calculated to the COM of an individual item 104 that has been added or removed in an interaction using the following equation:

$$\text{LWC}=w2*(a-2b)/(w2+w1)+b \qquad \text{Equation 2}$$

The weight change corresponding to the interaction may be calculated as:

$$\text{Total weight change}=w1+w2 \qquad \text{Equation 3}$$

During operation, the weight data 126 may be "tared" or zeroed out while the load on the platform measured by the weight sensors 120(6) is in a stable state. Subsequent changes in the weight data 126 may be used to produce the weight distribution data 440. For example, the inventory location 114 when fully loaded may have a total weight of 15 kg. The processing module 328 may "tare" these values, such that the weight is read to be "0 kg". A subsequent interaction, such as a removal of two items 104, may result in a total weight change of 910 g, with a weight distribution of 850 g on the left and 55 g on the right. Given a shelf width "a" of 1 meter (m) and the distance "b" of 0.1 m, the LWC is at 0.148 m from the origin at the leftmost edge of the shelf.

The processing module 328 or other modules may transform the weight characteristic data 436 from one form to another. For example, the LWC data 442 may be determined using the weight distribution data 440. Similarly, the LWC data 442 may be used to derive a COM.

The inventory management module 324 may be configured to generate activity data 336, based at least in part on non-weight data 128. The activity data 336 provides information indicative of an activity, or lack thereof, at the inventory location 114. The activity data 336 may include one or more of location data 444, motion data 446, duration data 448, user identifier 450, or other data 452. For example, the other data 452 may include a count of items 104 at the partitioned area 134, a change in count of items 104 at the partitioned area 134, and so forth.

In some implementations, the activity data 336 may be generated at least in part using the intermediate data 334. For example, the motion data 446 may be generated using differential data 434 obtained from a plurality of images.

The location data 444 provides information indicative of a particular position or partitioned area 134 that the activity is associated with. For example, a shadow 132 detected by an optical sensor array 120(13) beneath the partitioned area 134(1) may be processed to generate location data 444 indicative of the partitioned area 134(1), or coordinates therein. In some implementations, the location data 444 may be generated based on the physical configuration data of the facility 102. For example, given a known placement of the camera 120(1) above the partitioned area 134, and the FOV 130 of that camera 120(1) being directed toward the partitioned area 134, the image data 422 obtained from the camera 120(1) is associated with that particular location.

The motion data 446 may comprise information indicative of motion of one or more objects within the facility 102, particularly with regard to the inventory location 114, partitioned area 134, or other particular pointer area. For example, the motion data 446 may indicate that an object is approaching the inventory location 114. In one implementation, the motion data 446 may be determined at least in part on the image data 422 acquired by one or more of the cameras 120(1).

The duration data 448 provides information indicative of the duration of an activity. For example, the duration data 448 may provide information about how long the hand of the user 116 remained within the FOV 130 in the image data 422.

In some implementations, the activity data 336 may be generated at least in part using the intermediate data 334. For example, the motion data 446 may be generated using differential data 434 obtained from a plurality of images.

The user identifier 450 provides information indicative of a particular user 116. For example, the user identifier 450 may comprise an account number, account name, key value, serial number, and so forth, that is associated with a particular user 116 or user account. The processing module 328 may be configured to determine the user identifier 450. For example, the processing module 328 may use facial recognition techniques to recognize a particular user 116 and associate the corresponding user identifier 450 with that person.

The processing module 328 may generate interaction data 340 using the intermediate data 334, activity data 336, and so forth. The interaction data 340 may comprise one or more of an interaction type 454, a partition identifier 414, an item identifier 402, a quantity change 456, and so forth. For example, differential data 434 such as the location of pixels 424 in a differential image produced from image data 422 may be used to determine a hand of the user 116 is moving in an area corresponding to the partitioned area 134.

The interaction type 454 may provide information about whether the interaction is determined to be a pick, place, touch, pick and place, and so forth. The processing module 328 may use the intermediate data 334 or other information such as the sensor data 124, the activity data 336, and so forth, to determine the interaction type 454. For example, weight characteristic data 436 may be generated from the weight data 126. Based on activity data 336 indicative of motion at the inventory location 114, the processing module 328 determines that the weight data 126 is reliable and uses non-weight data 128 to disambiguate between several hypotheses corresponding to the weight characteristic data 436.

The partition identifier 414 may indicate the particular partition data 330 corresponding to the partitioned area 134 associated with the hand. Using the partition identifier 414, the item identifier 402 may be determined. For example, a particular portion of the FOV 130 may be associated with a particular partitioned area 134, and the item 104 stowed thereby.

The item identifier 402 specifies the item 104 implicated by the interaction. For example, the item identifier 402 may indicate the item 104 that was picked, placed, touched, and so forth. In some implementations, the item identifier 402 may be determined at least in part by the weight data 126. For example, as described above, based on one or more of the weight characteristic data 436, the particular item 104 may be identified, the quantity change of the items 104 at the inventory location 114 resulting from the interaction may be determined, and so forth.

The quantity change 456 provides information indicative of a change in the quantity of the item 104 resulting from the interaction. For example, the quantity change 456 may indicate a value of "−1" when a single item 104 is picked from the inventory location 114, or value of "+3" when three items 104 are placed to the inventory location 114.

The item data 136 may provide information about an individual item 104, while the interaction data 340 may comprise information about one or more of the items 104 that may be undergoing some change, such as movement from the inventory location 114 to the tote 118.

In one implementation, the processing module 328 may generate other information about the items 104 stowed at the inventory location 114. For example, the interaction data 340 may be analyzed to determine if a user 116 such as a person tasked with restocking the inventory location 114 is rotating stock such that old stock is brought to the front while new stock is placed behind.

The processing module 328 may generate information indicating that an item 104 has been misplaced in an incorrect partitioned area 134. For example, the weight characteristic data 436 may be compared to item weight data 404. Based on a mismatch, it may be determined an item 104 has been incorrectly stowed in the wrong partitioned area 134. In one implementation, a user 116 of the facility 102 may be identified, and a particular tote 118 may be associated with that user 116. The inventory of items 104 stowed within the tote 118 may be used to determine if an item 104 has been incorrectly placed in the wrong inventory location 114. Based on proximity of the user 116, the tote 118, or both to the inventory location 114, the hypotheses data 338 may be constrained to hypotheses that involve the items 104 stowed in the tote 118, carried by the user 116, or at the inventory location 114. For example, the set of items 104 that may be included in the hypotheses data 338 for determining an interaction at the inventory location 114 may be limited to those items 104 are that within arm's reach of the user 116 while at the inventory location 114. The sensor data 124 may then be used to select a hypothesis, based on which the interaction data 340 may be generated. For example, the inventory management module 324 may track the items 104 stowed in the tote 118 of the user 116. The user 116 may move an item 104(1) from the tote 118 to the inventory location 114(17) that is not designated for stowage of item 104(1). The inventory management module 324 may determine the tote 118 is within a threshold distance of the inventory location 114(17). The hypotheses data 338 may be constrained to include hypotheses that describe items 104 carried by the tote 118 within the threshold distance, items 104 stored at the inventory location 114(17), and so forth. Based on the weight characteristic data 436, other non-weight data 128, or a combination thereof, the hypotheses that describes movement of the item 104(1) from the tote 118 to the inventory location 114(17) may be designated as the solution.

Figure 5:
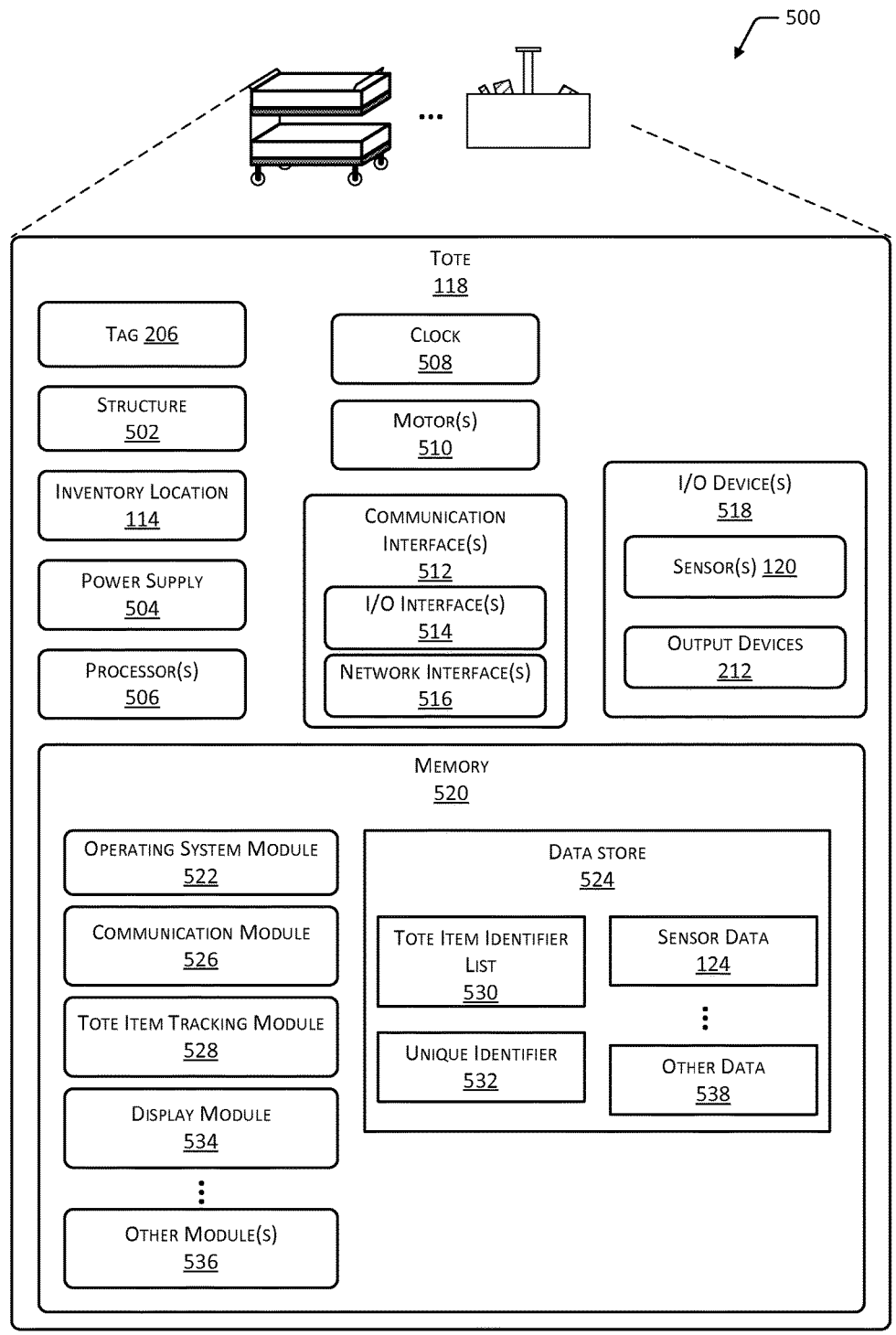
FIG. 5 illustrates a block diagram of a tote, according to some implementations.

FIG. 5 is a block diagram 500 of the tote 118, according to some implementations. The tote 118 may include several form factors such as a wheeled cart, hand-carried cart, basket, bag, and so forth. For example, the tote 118 may include a plurality of wheels enabling the tote 118 to be moved within the facility 102.

In some implementations, the tote 118 may have identifiers, tags 206, or other indicia thereupon. The tag 206 may be affixed to, integral with, or otherwise associated with the tote 118. For example, a machine-readable optical code, such as a barcode, may be affixed to a side of the tote 118.

The tote 118 may comprise a structure 502. The structure 502 may include components comprising one or more of metal, plastic, composite materials, ceramic, wood, and so forth. For example, the structure 502 may comprise a carbon-fiber frame. One or more inventory locations 114 may be integral with, or attached to, the structure 502. For example, the structure 502 may comprise a frame with wheels while the inventory location 114 comprises a basket to hold one or more items 104 during use.

The tote 118 may include a power supply 504. The power supply 504 is configured to provide electrical power suitable for operating the components in the tote 118 or coupled thereto. For example, the power supply 504 may comprise batteries, capacitors, fuel cells, photovoltaic cells, wireless power receivers, conductive couplings suitable for attachment to an external power source, and so forth.

The tote 118 may include one or more hardware processors 506 (processors) configured to execute one or more stored instructions. The processors 506 may comprise one or more cores. One or more clocks 508 may provide information indicative of date, time, ticks, and so forth. For example, the processor 506 may use data from the clock 508 to trigger a preprogrammed action, generate a timestamp for sensor data 124 acquired by the sensors 120 onboard the tote 118, and so forth.

In some implementations, the tote 118 may include one or more motors 510 or other motive devices. The motor 510 may be configured to move or assist the user 116 in moving the tote 118 from one location to another within the facility 102. For example, the tote 118 may comprise a wheeled vehicle able to move within the facility 102, such as from one aisle 112 to another.

The tote 118 may include one or more communication interfaces 512 such as I/O interfaces 514, network interfaces 516, and so forth. The communication interfaces 512 enable the tote 118, or components thereof, to communicate with other devices or components. The communication interfaces 512 may include one or more I/O interfaces 514. The I/O interfaces 514 may comprise I2C, SPI, USB, RS-232, and so forth.

The I/O interface(s) 514 may couple to one or more I/O devices 518. The I/O devices 518 may include one or more of the input devices such as the sensors 120. As described above, the sensors 120 may include cameras 120(1), buttons 120(3), touch sensors 120(4), weight sensors 120(6), accelerometers 120(10), gyroscopes 120(11), magnetometers 120(12), and so forth. In one implementation, an optical sensor array 120(13) may be located on or within the tote 118.

The I/O devices 518 may include the output devices 212 such as the haptic output devices 212(1), audio output devices 212(2), display devices 212(3), and so forth. For example, the tote 118 may comprise a display device 212(3) configured to present a graphical user interface (GUI) to the user 116. In some embodiments, the I/O devices 518 may be physically incorporated with the tote 118 or may be externally placed.

The network interfaces 516 may be configured to provide communications between the tote 118 and other devices, such as other totes 118, routers, access points 210, servers 204, and so forth. The network interfaces 516 may include devices configured to couple to PANs, LANs, WANs, and so forth. For example, the network interfaces 516 may include devices compatible with Ethernet, Wi-Fi®, Bluetooth®, ZigBee®, LTE, and so forth.

The tote 118 may also include one or more busses or other internal communications hardware or software that allow for the transfer of data between the various modules and components of the tote 118.

As shown in FIG. 5, the tote 118 may include one or more memories 520. The memory 520 may comprise one or more CRSM as described above with regard to memory 316 on server 204. The memory 520 may provide storage of computer-readable instructions, data structures, program modules, and other data for the operation of the tote 118. A few example functional modules are shown stored in the memory 520, although the same functionality may alternatively be implemented in hardware, firmware, or as a SOC.

The memory 520 may include at least one OS module 522. The OS module 522 may be configured to manage hardware resource devices such as the I/O interfaces 514, the I/O devices 518, the communication interfaces 512, and provide various services to applications or modules executing on the processors 506. The OS module 522 may implement a variant of the FreeBSD™ operating system as promulgated by the FreeBSD Project; other UNIX™ or UNIX-like variants; a variation of the Linux™ operating system, such as Android® as promulgated by Google, Inc. of Mountain View, Calif., USA. Other OS modules 522 may be used, such as the Windows® operating system from Microsoft Corporation of Redmond, Wash., USA; the LynxOS® from LynxWorks of San Jose, Calif., USA; and so forth.

One or more of the following modules may also be stored in the memory 520. These modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including servers 204, network attached storage devices, and so forth.

A communication module 526 may be configured to establish communications with one or more of the sensors 120, servers 204, or other devices. The communications may be authenticated, encrypted, and so forth.

The memory 520 may also store a tote item tracking module 528. The tote item tracking module 528 may be configured to maintain a tote item identifier list 530. The tote item identifier list 530 may comprise data indicating one or more items 104 associated with the tote 118. For example, the tote item tracking module 528 may receive input from a user 116 by way of a touch screen display with which the user 116 may enter information indicative of the item 104 placed in the tote 118. In another example, the tote item tracking module 528 may receive input from one or more I/O devices 518, such as the weight sensor 120(6), an RFID reader 120(8), and so forth. The tote item tracking module 528 may send the list of items 104 to the inventory management system 122. The tote item tracking module 528 may also be configured to receive information from the inventory management system 122. For example, a list of items 104 to be picked may be presented within a user interface on the display device 212(3) of the tote 118.

A unique identifier 532 may also be stored in the memory 520. In some implementations, the unique identifier 532 may be stored in rewritable memory, write-once-read-only memory, and so forth. For example, the unique identifier 532 may be burned into a one-time programmable, non-volatile memory, such as a programmable read-only memory (PROM). In some implementations, the unique identifier 532 may be part of a communication interface 512. For example, the unique identifier 532 may comprise a media access control (MAC) address associated with a Bluetooth® interface. The communication module 526, the tote item tracking module 528, or other modules may use the unique identifier 532 when communicating with other devices such as the server 204. For example, the unique identifier 532 may be used to identify data sent by the tote 118.

The memory 520 may include a display module 534. The display module 534 may be configured to present information, such as information received from the one or more servers 204 or generated onboard the tote 118. For example, the display module 534 may comprise a markup language rendering engine configured to process user interface data received from the server 204 to generate a user interface. In some implementations, the display module 534 may also process input made to the user interface by way of input devices, such as the sensors 120.

Other modules 536 may also be stored within the memory 520. In one implementation, a data handler module may be configured to generate data indicative of the user 116, the tote 118, or another of one or more objects in range of the sensors 120 of the tote 118. For example, the data handler module may be configured to acquire data from one or more sensors 120 of the tote 118 and generate sensor data 124. For example, the sensor data 124 may comprise information from the magnetometer 120(12) indicative of orientation of the structure 502. The sensor data 124 may be stored in the data store 524 and may be sent to the server 204 for further processing. Other data 538 may also be stored within the data store 524. For example, configuration settings, prestored activation sequences, user interface preferences, item data 136, and so forth, may be stored within the data store 524.

The other modules 536 may also include a user authentication module, which may be configured to receive input and authenticate or identify a particular user 116. For example, the user 116 may enter a personal identification number (PIN) or may provide a fingerprint to a fingerprint reader to establish their identity.

Figure 6:
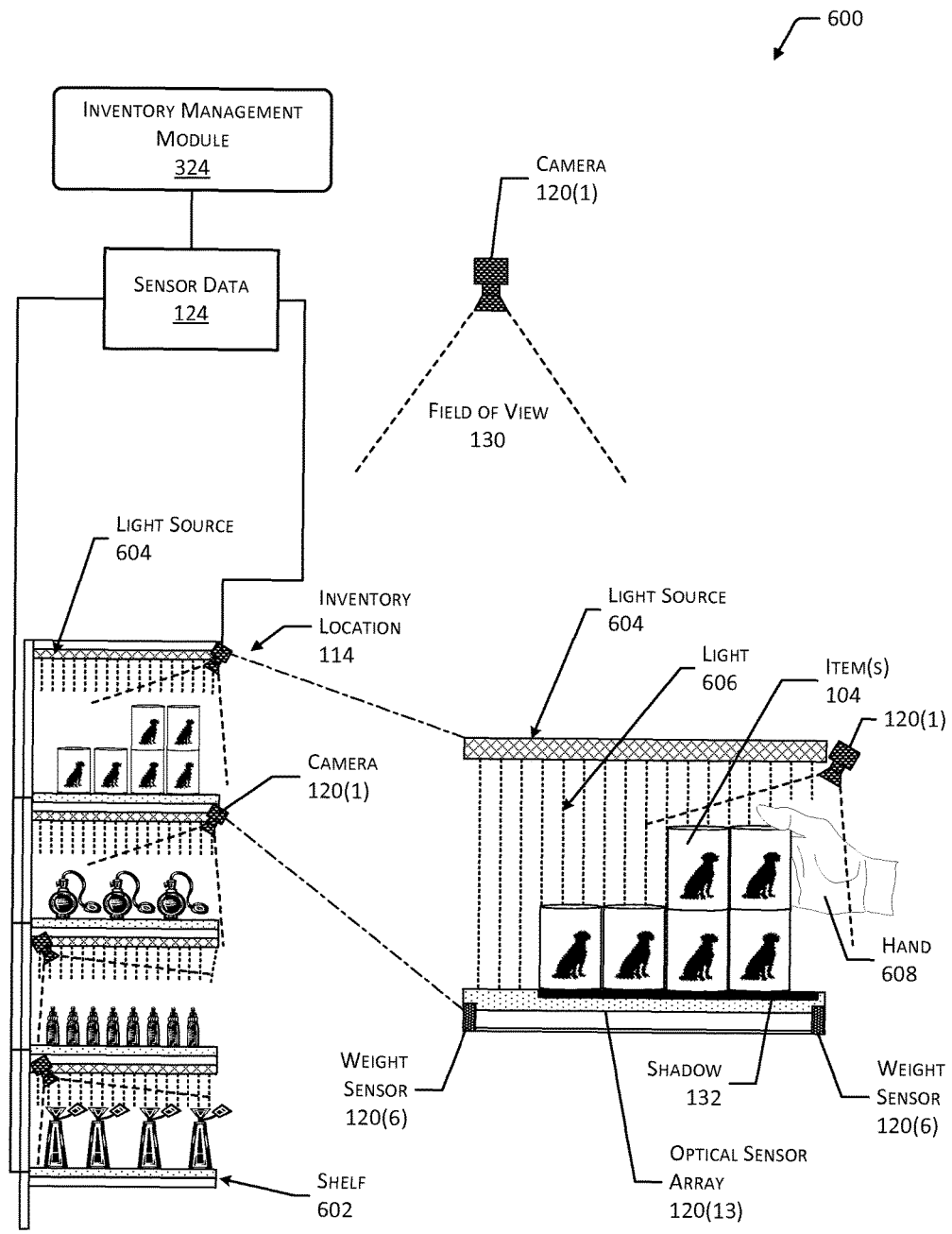
FIG. 6 illustrates a side view of an inventory location that includes various sensors, according to some implementations.

FIG. 6 illustrates a side view 600 of an inventory location 114 that includes various sensors 120, according to some implementations. In this illustration, the inventory location 114 comprises a shelf 602 on a rack.

Above the shelf 602 is a light source 604, configured to emit light 606. The light source 604 may comprise one or more of LEDs, quantum dots, electroluminescent devices, incandescent lamps, fluorescent lamps, and so forth. The light source 604 may be configured to emit light 606 in one or more wavelengths including, but not limited to, infrared, visible, or ultraviolet. In some implementations, to reduce dazzling the eyes of the user 116, the light source 604 may be configured to emit infrared light 606.

The light source 604 emits light 606 that is detectable by at least a portion of the optical sensors 120(7) in the optical sensor array 120(13). In some implementations, the light source 604 may be located elsewhere with respect to the optical sensor array 120(13). For example, the light source 604 may comprise an overhead light fixture that provides general illumination to the inventory location 114.

The shelf 602 may incorporate the optical sensor array 120(13) as illustrated in FIG. 6. For example, the shelf 602 may comprise a structure such as a piece of glass or plastic that is transparent to the wavelengths of light 606. The items 104 may rest upon the structure, as illustrated here, or may hang above the structure, such as from a peg or arm. In some implementations, items 104 may be stacked one atop another, such as shown here with stacked cans of pet food.

As a result of the light 606 impinging upon the item 104, a shadow 132 is cast upon at least a portion of the optical sensor array 120(13). The intensity of light within the shadow 132 may be dependent upon the transparency of the item 104. For example, a clear glass bottle holding water may cast a light shadow 132, while an opaque black plastic bottle may cast a very dark shadow 132. During an interaction, the shadow 132 may also be cast, at least in part, by another object such as a hand 608 of the user 116.

The optical sensor array 120(13) is configured to provide image data 422 to the inventory management module 324. The image data 422 may then be processed by the processing module 328 to generate the interaction data 340, such as which of the partitioned areas 134 held the item 104 the user 116 interacted with.

The light source 604 may be configurable to modulate the light 606. The light 606 may be modulated such that the optical sensor array 120(13) is able to filter out or disregard other light sources 604 and obtain image data 422 based on the light 606 coming from the known position of the light source 604. Modulation of light 606 may include, but is not limited to, carrier modulation, amplitude shift keying, pulse position modulation, Manchester encoding, and so forth. The optical sensor array 120(13) may be configured to process the data from the optical sensors 120(7) to generate light intensity values 426 for the light 606 having the predetermined modulation. For example, data values associated with non-modulated light may be disregarded or filtered out.

In another implementation, operation of the light source 604 and the optical sensor array 120(13) may be time synchronized. For example, the light source 604 may be configured to emit light 606 at a particular time and for a particular duration, such as 60 ms. The optical sensor array 120(13) may be configured to acquire data from the optical sensors 120(7) while the light source 604 is emitting light 606. In some implementations, first image data 422(1) acquired while the light source 604 is active may be compared with second image data 422(2) acquired while the light source 604 is inactive. A comparison may be made between the first image data 422(1) and the second image data 422(2) to filter out or otherwise calibrate the system for ambient light.

One or more weight sensors 120(6) may be used to obtain weight data 126 from a platform, such as the shelf 602. In this illustration, the weight sensors 120(6) are arranged at the corners of the shelf 602. In another implementation, the weight sensors 120(6) may be mounted on attachment points that affix the shelf 602 to the rack. For example, the bracket supporting the shelf 602 may include a strain gauge configured for use as a weight sensor 120(6).

One or more cameras 120(1) may also be positioned at one or more of on, in the, or around the inventory location 114. For example, cameras 120(1) may be arranged such that their FOV 130 looks on a shelf 602. The cameras 120(1) may be arranged at a front edge of the inventory location 114 such as closest to the aisle 112 during operation, at the back edge of the inventory location 114, both at the front and back edges, overhead, and so forth.

Figure 7:
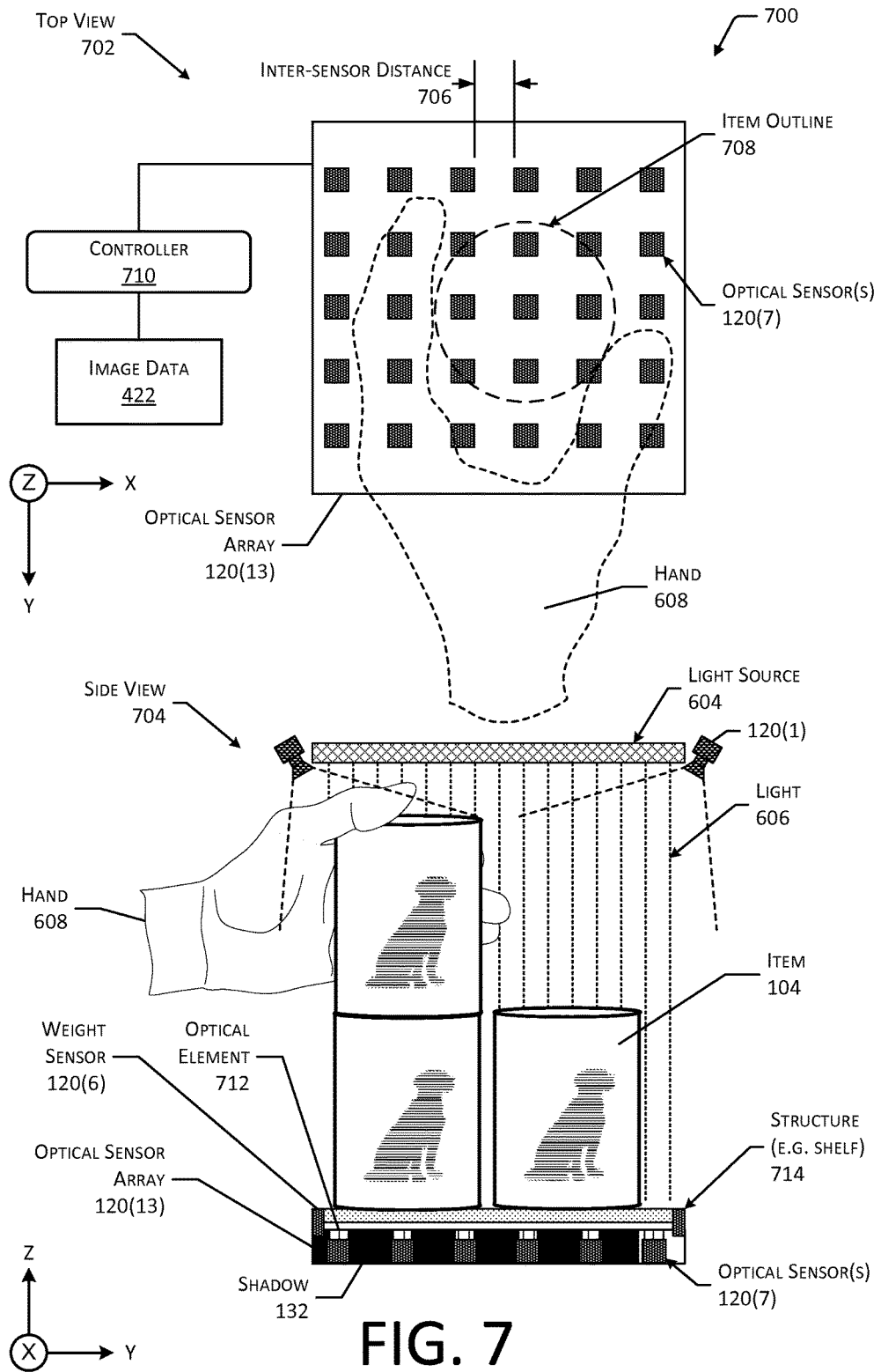
FIG. 7 illustrates enlarged top and side views of a portion of the inventory location, according to some implementations.

FIG. 7 is an illustration 700 of the optical sensor array 120(13), according to some implementations. In this illustration, a top view 702 and a side view 704 are presented.

As shown by the top view 702, the optical sensor array 120(13) may comprise a plurality of optical sensors 120(7). The optical sensors 120(7) may be arranged in a two-dimensional arrangement, such as the grid arrangement depicted here. The arrangement shown here comprises an array with an inter-sensor distance 706 that is approximately the same as measured along the X and Y axes. For example, the inter-sensor distance 706 may be at least 5 millimeters (mm) between the centers or the edges of the optical sensors 120(7). In some implementations, such as described below with regard to FIG. 8, the inter-sensor distance 706 may be representative of a distance between optical elements 712.

In other implementations, other arrangements of the optical sensors 120(7) may be used. For example, the arrangement may comprise a triangular space filling array with an optical sensor 120(7) located at each vertex.

The distribution or arrangement of the optical sensors 120(7) may be asymmetrical. In one implementation, the inter-sensor distance 706 may be varied. For example, a central region of the optical sensor array 120(13) may be sparsely populated with optical sensors 120(7) such that the inter-sensor distance 706 along the X and Y axes is greater than side regions flanking the central region. Within the side regions, the inter-sensor distance 706 may be lesser than that within the central region where the optical sensors 120(7) are sparsely populated.

For illustrative purposes, an item outline 708 of an item 104 and an outline of the hand 608 are depicted in the top view 702. The item outline 708 and corresponding shadow 132 that includes the footprint or shadow of the item 104 and the hand 608 are discussed in more detail below.

A controller 710 may be coupled to the optical sensors 120(7) of the optical sensor array 120(13). The controller 710 may comprise a microcontroller or other device configured to read out or otherwise acquire information from the optical sensors 120(7). The controller 710 may be configured to use the input from the optical sensors 120(7) to generate the image data 422. In some implementations, the controller 710 may provide the image data 422, such as a bitmap.

The side view 704 depicts additional components of the optical sensor array 120(13). In some implementations, the optical sensors 120(7) may be optically coupled to one or more optical element 712 devices. The optical elements 712 may comprise optical waveguides, optical fibers, mirrors, lenses, or other devices configured to direct, focus, control, or distribute at least a portion of incident light 606 to one or more of the optical sensors 120(7). The optical elements 712 may be arranged in the two-dimensional arrangement, while the optical sensors 120(7) may be otherwise arranged. For example, in one implementation, the optical sensors 120(7) may be located along an edge of the optical sensor array 120(13), and the optical elements 712 may comprise optical fibers mounted and configured as an array to gather the light 606 and direct the light 606 to the optical sensors 120(7).

In some implementations, a structure 714 may provide physical support for an item 104, may protect the optical sensor array 120(13) from damage, and so forth. The structure 714 may comprise a material transmissive to the wavelengths of light 606 that are detectable by the optical sensors 120(7). For example, the structure 714 may comprise glass or plastic that is transparent or translucent. In some implementations, the structure 714 may comprise a mesh or a material with holes through which light 606 may pass.

In the implementation depicted here, the items 104 rest upon the structure 714. In other implementations, the item 104 may be supported or suspended from above the structure 714, such as from support pegs or bars. The shadow 132 may comprise the shadow 132 cast by the hanging items 104. For example, the items 104 may be hanging from a peg or a hook.

In the implementation depicted here, the optical sensor array 120(13) is located below the item 104. The optical sensors 120(7) detect light 606 from above the structure 714, such as passing through the shelf 602. In other implementations, the optical sensor array 120(13) may be located in other positions relative to the item 104, such as above or behind. For example, the light source 604 and the optical sensor array 120(13) depicted in FIG. 7 may be transposed, such that the light 606 beneath the structure 714 is emitted and directed upward toward the optical sensor array 120(13). The shadow 132 may then result from the objects between the light source 604 below onto the optical sensor array 120(13) above. In another example, the optical sensor array 120(13) may be arranged vertically, such as to the rear or one side of the partitioned area 134, to gather data about height of items 104.

One or more weight sensors 120(6) are configured to determine the weight of the load on the structure 714. For example, the weight sensors 120(6) may provide a physical coupling between the structure 714 and another portion of the structure such as a support rib or frame.

Also depicted are cameras 120(1) configured to generate non-weight data 128 such as image data 422. The FOV 130 of the cameras 120(1) are configured to include at least a portion of the inventory location 114. For example, the cameras 120(1) may be mounted above the shelf 602 and configured with the FOV 130 looking down on to the shelf 602.

Figure 8:
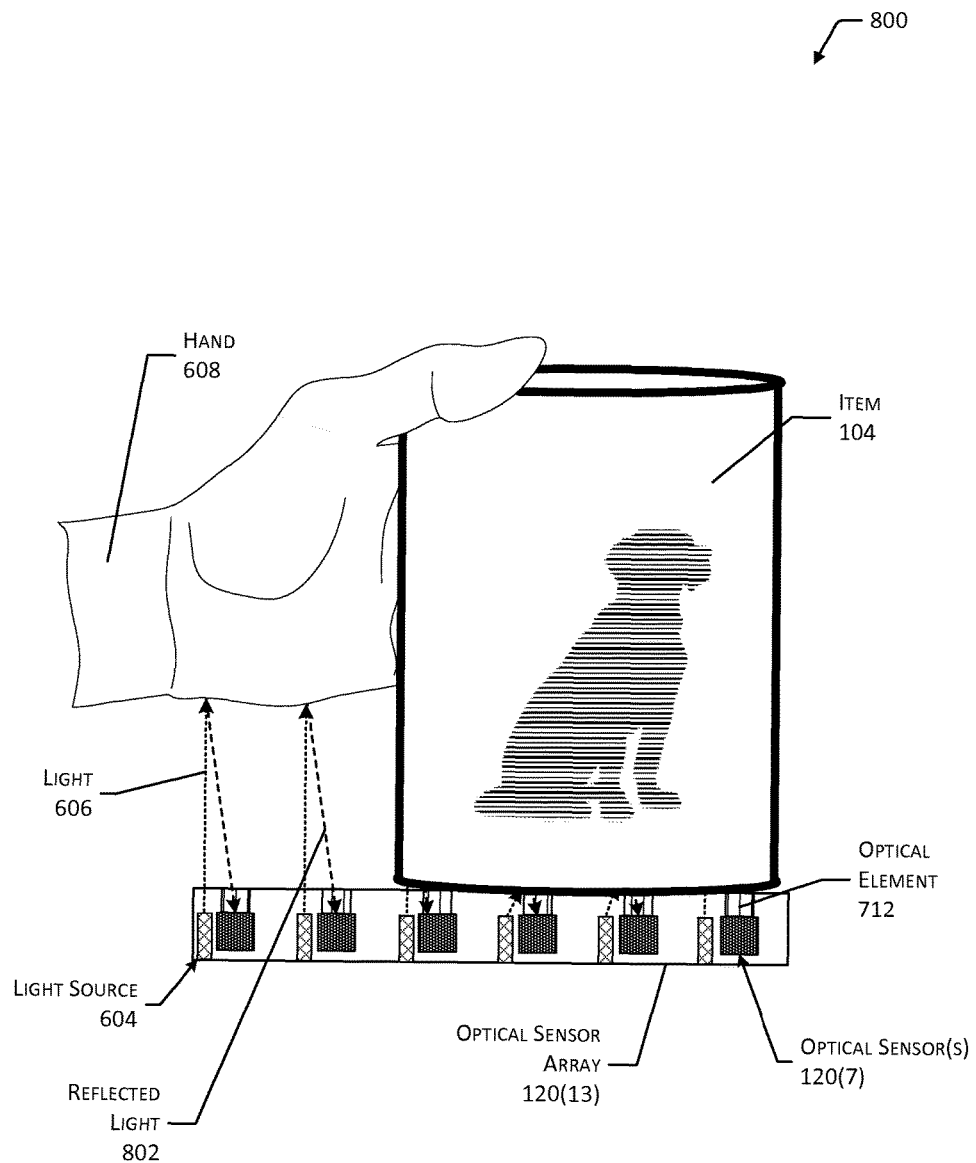
FIG. 8 illustrates an enlarged view of a portion of an optical sensor array using a light source adjacent to an optical sensor, according to some implementations.

FIG. 8 illustrates another implementation 800 of an optical sensor array 120(13). This implementation 800 may be utilized in situations such as where the inventory location 114 is open from above or an overhead light source 604 is otherwise infeasible for design, aesthetic, or engineering reasons.

In this implementation, the light source 604 is included in the optical sensor array 120(13). For example, the light sources 604 may comprise LEDs that are configured to emit light 606 toward where the item 104 may be stowed. The light 606 may be reflected from an object such as the hand 608, the item 104, and so forth. The reflected light 802 may be detected by one or more of the optical sensors 120(7). In some implementations, the light 606 may be distributed from the light source 604 using an optical waveguide, fiber optic fibers, or other features.

In one implementation, the optical sensor array 120(13) may comprise a plurality of proximity sensors 120(14). The proximity sensors 120(14) may use data indicative of proximity of an object such as the item 104 to generate the image data 422. For example, an array of capacitive proximity sensors 120(14) may be used to generate the image data 422.

Figure 9:
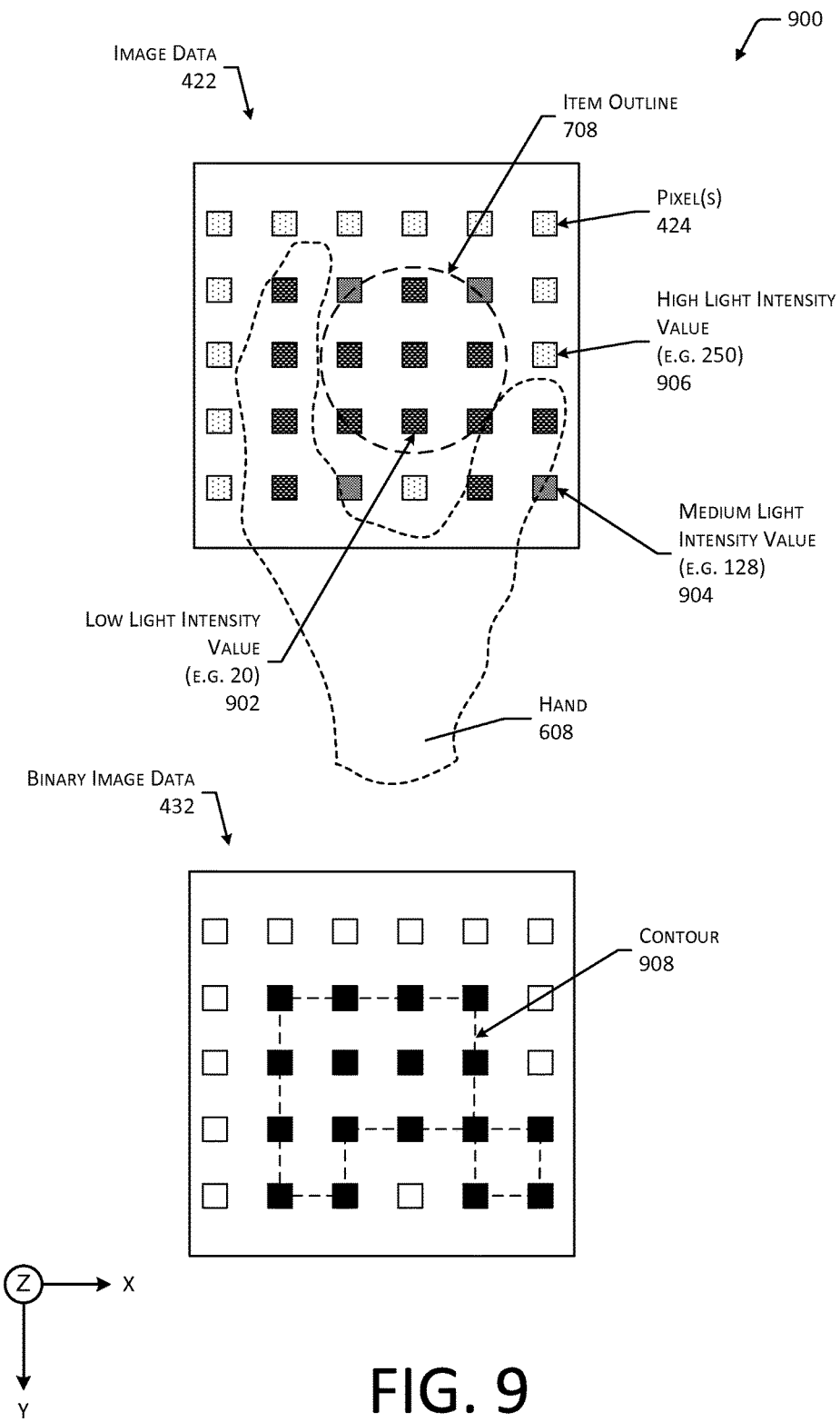
FIG. 9 illustrates image data, binary image data, and contour of a shadow of an item, according to some implementations.

FIG. 9 illustrates an overhead view 900 of image data 422, binary image data 432, and a contour of a shadow 132 of an item 114, according to some implementations.

As described above, the image data 422 may comprise a plurality of pixels 424. The pixels 424 provide information about the light intensity value 426 at a particular set of coordinates 428. For illustrative purposes only, and not by way of limitation, the pixels 424 are depicted in this figure as being spaced with regard to one another at the inter-sensor distance 706. However, during processing of the image data 422, the pixels 424 may be visualized or processed as if they were immediately adjacent one another with no intervening inter-sensor distance 706.

Presence of an object (such as the hand 608, the item 114, and so forth) adjacent to the optical sensor array 120(13) as illuminated by the light 606 will cast a shadow 132 upon the optical sensors 120(7) in the optical sensor array 120(13). In this illustration, low light intensity value 902 pixels 424 are depicted as being those pixels 424 for which the object completely covers or obscures the light 606. In this illustration, due to the placement of the item 114 and the hand 608, some of the optical sensors 120(7) are only partially covered, allowing more of the light 606 to impinge thereupon. These partially obscured pixels 424 exhibit a medium light intensity value 904. In comparison, the unobscured pixels 424 exhibit a high light intensity value 906.

In some implementations, the image data 422 may be visualized as a grayscale image. As described above, the processing module 328 may generate binary image data 432 from the image data 422. For example, the threshold value may be "200". As a result of the thresholding process, the pixels 424 having a light intensity value 426 of less than or equal to 200 may then be set to a binary "1".

As described above, the processing module 328 may generate differential data 434, such as differential images. For example, first binary image data 432(1) acquired at a first time may be subtracted from binary image data 432(2) acquired at a second time to generate the differential data 434.

The processing module 328 may process the binary image data 432 to determine the contour data. The contour data may comprise information about one or more contours 908 within the binary image data 432. For example, a single contour 908 is depicted in FIG. 9. The processing module 328 may also determine an area of the contour 908. In this illustration, the contour 908 is formed from the combined shadow 132 cast by the item 114 and the hand 608.

Information about the shadow 132 of the item 114 without the presence of another object such as the hand 608 may be obtained. For example, during the intake process, a shadow 132 may be obtained of a single item 114. Characteristics of that item 114 may be stored as the item data 136, such as storing the shape of the contour 908 as the geometry data 406.

Figure 10:
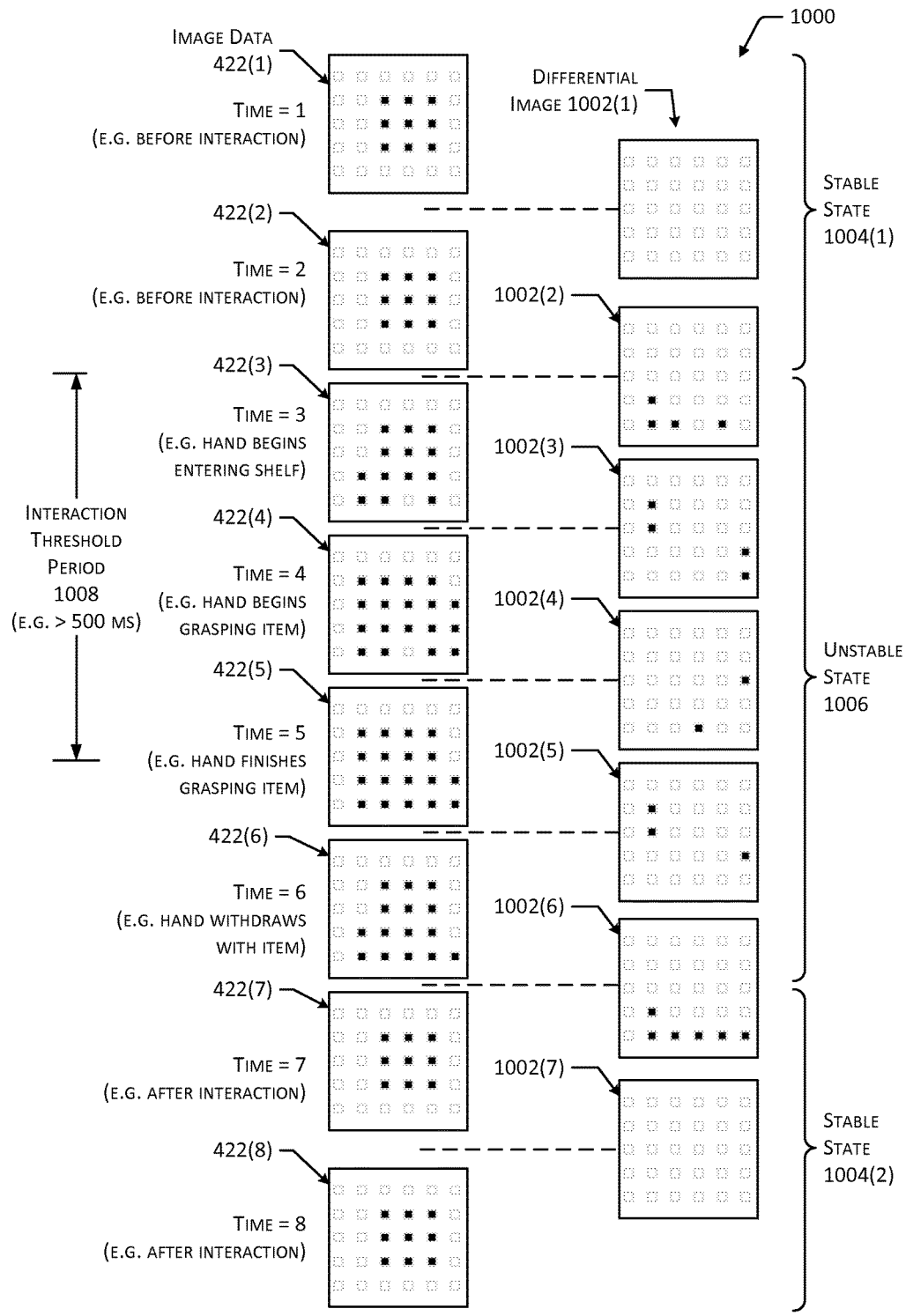
FIG. 10 illustrates a sequence of image data changing with time and differential images that may be used to determine activity at the inventory location, according to some implementations.

FIG. 10 illustrates a sequence 1000 of data that changes over time, and the use of those changes to generate interaction data 340. The sequence 1000 is depicted with time increasing down the page, from time=1 to time=8. At each of the times depicted, image data 422 is presented. The image data 422 may comprise images acquired by cameras 120(1), data from 3D sensors 120(2), binary image data 432, contour data, and so forth. The image data 422 may be acquired by one or more sensors 120, such as the camera 120(1), the optical sensor array 120(13), and so forth. For ease of illustration, and not as a limitation, the image data 422 depicted here may be considered to be representative of a binary image, with binary "1" being black squares indicative of the shadow 132 as obtained by the optical sensor array 120(13). The image data 422 depicts the scenario in which the items 104 are stacked one atop another, and the user 116 is picking or removing an item 104 uppermost on the stack.

The image data 422(1) was acquired before an interaction at time=1, and depicts a shadow 132 of the item 104. This shadow 132 is a square having an area of 9 pixels 424.

The image data 422(2) was also acquired before an interaction at time=2, and depicts the shadow 132 of the item 104. As described above, differential data 434 may be generated from the image data 422. In this illustration, differential images 1002 are depicted. The differential images 1002 may be produced by comparing two or more of the image data 422. In this illustration, the differential image 1002 is produced by comparing successive image data 422. For example, the differential image 1002 may be produced by subtracting the image data 422(2) from the image data 422(1). Because no interaction has taken place, in this illustration the differential image 1002(1) shows only white pixels 424 (having a binary "0" value in this illustration).

As described above, the time during which the image data 422 is unchanging or experiences changes less than a threshold value may be deemed to be a stable state 1004. Continuing the example, as shown here, the differential image 1002(1) having no black pixels 424 may be deemed to indicate that, for the period of time=1 to time=2 occurring between the image data 422(1) and 422(2) used for comparison, the image data 422 is in a first stable state 1004(1).

At time=3, the hand 608 may begin to enter the inventory location 114, such as to grasp the item 104 stowed therein. The presence of the fingers on the hand 608 add to the overall shadow 132 indicated here. At time=4, the hand 608 completes the approach to the item 104 and begins to grasp the item 104, further enlarging the shadow 132 by the blocking of the light 606 by the thumb. At time=5, the hand 608 finishes grasping the item 104. At time=6, the hand 608 withdraws the item 104 from the inventory location 114. At time=7, the interaction is complete, the hand 608 and the item 104 that was picked are completely removed, and the shadow 132 now depicted is that of the remaining item 104 at the inventory location 114, such as a remaining can of pet food. At time=8, no further interaction has taken place.

In this illustration, a differential image 1002 is generated comparing each of the image data 422 to the previous image data 422. For example, the differential image 1002(2) is produced by comparing the image data 422(3) of time=3 with the image data 422(2) of time=2. In other implementations, the comparison may include image data 422 obtained at other times. For example, the differential image 1002 may be generated by comparing the most recent image data 422 with the last known image data 422 corresponding to a stable state 1004, such as the image data 422(2) at time=2.

The processing module 328 may deem the image data 422 to be in an unstable state 1006 when the change between two or more image data 422 exceeds a threshold specified in the threshold data 332. For example, the threshold data 332 may specify a threshold count of 2 or more pixels 424 as indicative of a change. In this example, the count of the non-zero (black) pixels 424 in the respective image data 422(3)-422(6) meet or exceed this threshold. As a result, the time interval from time=3 (corresponding to the time of the image data 422 at which changes began) to time=6 (corresponding to the time of the image data 422 at which changes last occurred) may be designated as an unstable state 1006.

Occurrences such as shadows falling on the optical sensor array 120(13) that are cast by people moving past, electronic noise, glitches in the optical sensors 120(7), and so forth, could result in erroneous interaction data 340. To mitigate this, one or more conditions may be tested prior to the generation or use of the interaction data 340.

In one implementation, the condition may comprise a change in the characteristics of the pixels 424 in the image data 422 between stable state 1004 periods. For example, the user 116 may remove two items 104 that were stacked one atop another, leaving more optical sensors 120(7) exposed. As a result, the shadow 132 during the later stable state 1004 differs from the earlier stable state 1004.

In another implementation, the condition may comprise an amount of time the image data 422 was in an unstable state 1006 exceeding a threshold value. The amount of time in an unstable state 1006 may be determined by calculating a difference between the time of the beginning of a second stable state 1004(2) and a last known time of the first stable state 1004(1). For example, the unstable state 1006 has an elapsed time or duration of 5 time intervals.

By using the time spent in the unstable state 1006 as a condition, occurrences such as a shadow 132 cast by a passerby may be prevented from generating erroneous interaction data 340. An interaction threshold period 1008 may specify a threshold or minimum time that the unstable state 1006 must meet or exceed for the interaction data 340 to be determined. Continuing the example above, assuming the optical sensor array 120(13) is obtaining image data 422 every 200 ms, each time interval is 200 ms, and thus the 5 intervals of the unstable state 1006 has a total duration of 1000 ms. The interaction threshold period 1008 may be set to 500 ms. As a result, image data 422 obtained during periods of unstable state 1006 that are less than 500 ms may be disregarded. In comparison, image data 422 during unstable periods that are greater than or equal to 500 ms may be processed. Given this interaction threshold period 1008 and the duration of the unstable state 1006 in this illustration, the processing module 328 may generate the interaction data 340.

Other techniques may be also used to reduce the effect of weight data 126 that may contain noise. For example, the activity data 336 may be used to determine when an activity is taking place at the inventory location 114, or portion thereof such as the partitioned area 134. Continuing the example, the changes in the image data 422 associated with the unstable state 1006 indicate that an activity is taking place. In this example, the activity is that of the user 116 reaching in and removing an item 104. The determination of this activity may be used to select particular weight data 126 for processing. For example, the shadow 132 produced by the hand 608 entering the shelf 602 at time=3 may result in motion data 446. Based on the motion data 446, the processing module 328 may use the weight data 126 having a timestamp 420 corresponding to time=2 to generate first weight data 126(1) that may then be compared with second weight data 126(2) having a timestamp 420 corresponding to time=7 to generate weight change data 438. For example, the first weight data 126(1) and the second weight data 126(2) may be subtracted one from the other to generate the weight change data 438.

In comparison, weight data 126 obtained during a stable state 1004 for which no activity data 336 is associated may be disregarded, or used for other purposes. Thus, noisy weight data 126, such as false positives of a change in quantity at the inventory location 114 but which are measuredly the result of vibration of the passing train may be ignored.

The examples above depict sensor data 124 as acquired at successive contiguous points in time. In other implementations, the sensor data 124 may be acquired or processed at other intervals. For example, every "$n^{th}$" image data 422 may be acquired or processed, where n is a positive non-zero integer. Furthermore, the comparisons to determine whether the sensor data 124 is in a stable state 1004 or an unstable state 1006 may also be based on consecutively acquired data or data acquired at other intervals.

Figure 11:
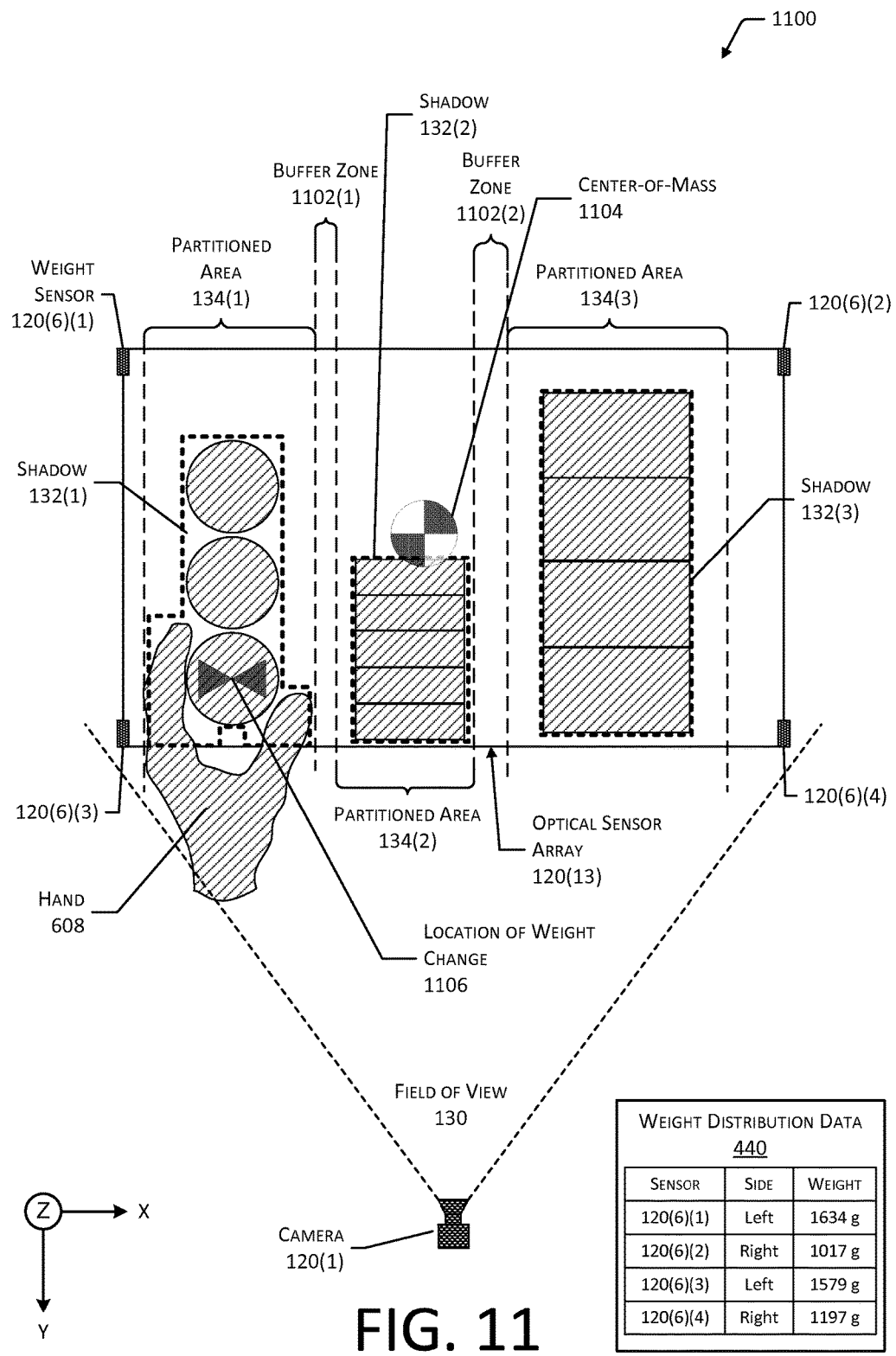
FIG. 11 illustrates an overhead view of partitioned areas at the inventory location, the shadows of objects on partitioned areas, a location of weight change, and a center-of-mass (COM) of the inventory location, according to some implementations.

FIG. 11 illustrates an overhead view 1100 of partitioned areas 134 at the inventory location 114, the shadows 132 of objects on the partitioned areas 134, and weight distribution of the inventory location 114, according to some implementations.

As described above, a single inventory location 114 may be used to stow different items 104. The inventory location 114 may be partitioned into a plurality of partitioned areas 134. The inventory location 114 has been partitioned into a first partitioned area 134(1), a second partitioned area 134(2), and a third partitioned area 134(3). A buffer zone 1102 may be provided to improve distinction between the partitioned areas 134.

As described above, partition data 330 may designate a particular portion or area of the inventory location 114 as being associated with a particular partitioned area 134. For example, the partition data 330 may describe the size and the shape of the partitioned areas 134, the position of the partitioned areas 134 with respect inventory location 114, and so forth.

In some implementations, the inventory location 114 may be serviced by one or more optical sensor arrays 120(13). During operation, the optical sensor array 120(13) produces image data 422. The inventory management module 324 may process the image data 422 to determine the presence of one or more shadows 132. As the user 116 reaches for an item 104 stowed at the inventory location 114 in one of the partitioned areas 134, their hand 608 casts an additional shadow 132 onto the optical sensor array 120(13). For example, as depicted in FIG. 11, the hand 608 of the user 116 is reaching to grasp one of the items 104 stowed at the first partitioned area 134(1). As a result, a shadow 132(1) comprising the rectangular shadow 132 cast by the items 104 and the hand 608 is formed. Based on this change in the shadow 132(1), interaction data 340 may be generated that indicates an interaction is occurring at the partitioned area 134(1). Using the partition data 330, the partitioned area 134(1) may be associated with the item identifier 402 of the item 104 stowed therein.

During some interactions, the shadow 132 before and after an interaction may not change. For example, as the user 116 removes an item 104 from a top of a stack, such as an uppermost can of pet food, the shadow 132 cast by the remaining can sitting on the shelf 602 remains unchanged. However, the processing module 328 may be configured to detect the shadow 132 cast by the hand 608, the item 104 as it is removed, and so forth.

In other interactions, the removal of an item 104 may provide additional information to the processing module 328 that may be used to determine occurrence of an interaction. For example, first image data 422(1) may show a rectangle with an area of 12 pixels 424 while second image data 422(2) acquired at a later time may indicate that the rectangle is now smaller with an area of 8 pixels 424. As a result, the interaction data 340 may indicate an interaction type 454 of a "pick". Likewise, an increase in the area of the shadow 132 may indicate an interaction type 454 of a "place", as a newly placed item 104 blocks at least some of the light 606.

In another implementation, the optical sensor array 120(13) may be mounted to gather data about a shadow 132 of a stack of items 104. For example, the optical sensor array 120(13) may be located on a side wall or partition separating the partitioned area 134(1) from 132(2) while the corresponding light source 604 may be arranged on the opposite side of the partitioned area 134.

Similar techniques may be used to process other image data 422, such as obtained from one or more cameras 120(1) having a FOV 130 that includes at least a portion of the inventory location 114. For example, a transformation matrix may specify a correspondence between the location of the pixels 424 in the image data 422 and the position of the partitioned area 134 on the inventory location 114. As a result, the presence of motion of an object in the image, such as a hand 608, may be determined and associated with a particular inventory location 114, partitioned area 134, or other location.

In some implementations, the processing module 328 may calculate quantity data 412 for a particular partitioned area 134. In one implementation, the calculation may use information based on the image data 422. For example, the area of a shadow 132 in the image data 422 obtained from an optical sensor array 120(13) while in a stable state (such as when no hand 608 is present) may be divided by previously stored geometry data 406 such as the area of the shadow 132 of an individual item 104, and rounding the resulting value to a nearest integer value. The integer value may then be used as the quantity data 412.

In other implementations, the processing module 328 may calculate quantity data 412 for a particular partitioned area 134 using the weight data 126. This calculation is described below in more detail.

A plurality of optical sensor arrays 120(13) may be used in conjunction with the same inventory location 114, partitioned area 134, and so forth. For example, two or more optical sensor arrays 120(13) mounted perpendicular to one another may be used to generate two sets of shadow data of items 104. Based at least in part on this shadow data, a volume occupied by objects such as the items 104, the hand 608, and so forth, may be determined. The non-weight data 128 may be used to generate interaction data 340, determine quantity data 412, and so forth.

As described above, the inventory location 114 may have one or more weight sensors 120(6) to generate weight data 126 about a load. For example, as depicted here, weight sensors 120(6)(1) through 120(6)(4) are arranged at each of the four corners of an inventory location 114 comprising a shelf 602. The weight sensors 120(6)(1) and 120(6)(3) are on a left side of the inventory location 114, while weight sensors 120(6)(2) and 120(6)(4) are on a right side of the inventory location 114. In other implementations, the weight sensors 120(6) may be placed at other locations on or relative to the inventory location 114. The load may include a portion of the shelf 602, other structures such as partitions, as well as the items 104.

Each item 104 has inherent physical properties such as a weight, individual COM, height, width, depth, shape, and so forth. A group or collection of items 104 that are supported by or part of a common structure have a combined weight distribution across a plurality of weight sensors 120(6). An illustration of weight distribution data 440 is depicted in FIG. 11 as a table that further indicates the side of the inventory location 114 that the weight sensor 120(6) is located on.

Individual objects have their own inherent COM. Groups of item 104, such as the entire inventory location 114 and the objects stowed therein also have a COM. Depicted in this figure is an indicia of a center-of-mass (COM) 1104 for the entire inventory location 114 including the items 104 stowed thereby, hardware on the shelf 602, and so forth. In this illustration, the COM 1104 is located within the second partitioned area 134(2). As illustrated with regard to FIG. 12, a change in the quantity or the arrangement of the items 104 may result in a change in weight distribution and the COM 1104.

The COM 1104 may be expressed in terms of coordinates with respect to an origin. In some implementations, the COM 1104 may be determined along a single dimension, such as the width of the inventory location 114 is represented by the X axis in this figure. In this implementation, the values from the weight data 126 obtained from the weight sensors 120(6) located on the left side may be summed together to provide a single "left" weight data 126, while the values from the weight data 126 obtained from the weight sensors 120(6) located on the right side may be summed together to provide a single "right" weight data 126. The COM 1104 for the inventory location 114 may thus be determined using the "left" weight data 126 and the "right" weight data 126, with the position of the COM 1104 expressed as a linear measurement.

Also depicted is a location of weight change (LWC) 1106. The LWC 1106 in this illustration corresponds to the position, with respect to the inventory location 114, of the COM of the particular item 104 that the hand 608 is removing. The LWC 1106 may be determined as described above with regard to FIG. 4, in particular Equation 2.

The weight data 126 and non-weight data 128 may be used to generate interaction data 340. In some implementations, the non-weight data 128 may be used to select a hypothesis that has been determined based on the weight characteristic data 436. For example, the image data 422 obtained from the camera 120(1) or from the optical sensor array 120(13) may be used to determine activity data 336. The activity data 336 may be used to select or discard hypotheses based on whether activity has been detected at a particular partitioned area 134 or inventory location 114. The selected hypothesis is designated as a solution, and the values of the variables of the solution may be used to generate the interaction data 340. For example, the solution may be a hypothesis that specifies a quantity of 2 of item 104(1) were removed from the first partitioned area 134(1).

The interaction data 340 may be generated based on the solution that indicates a quantity of 2 of item 104(1) were removed from the first partitioned area 134(1).

Figure 12:
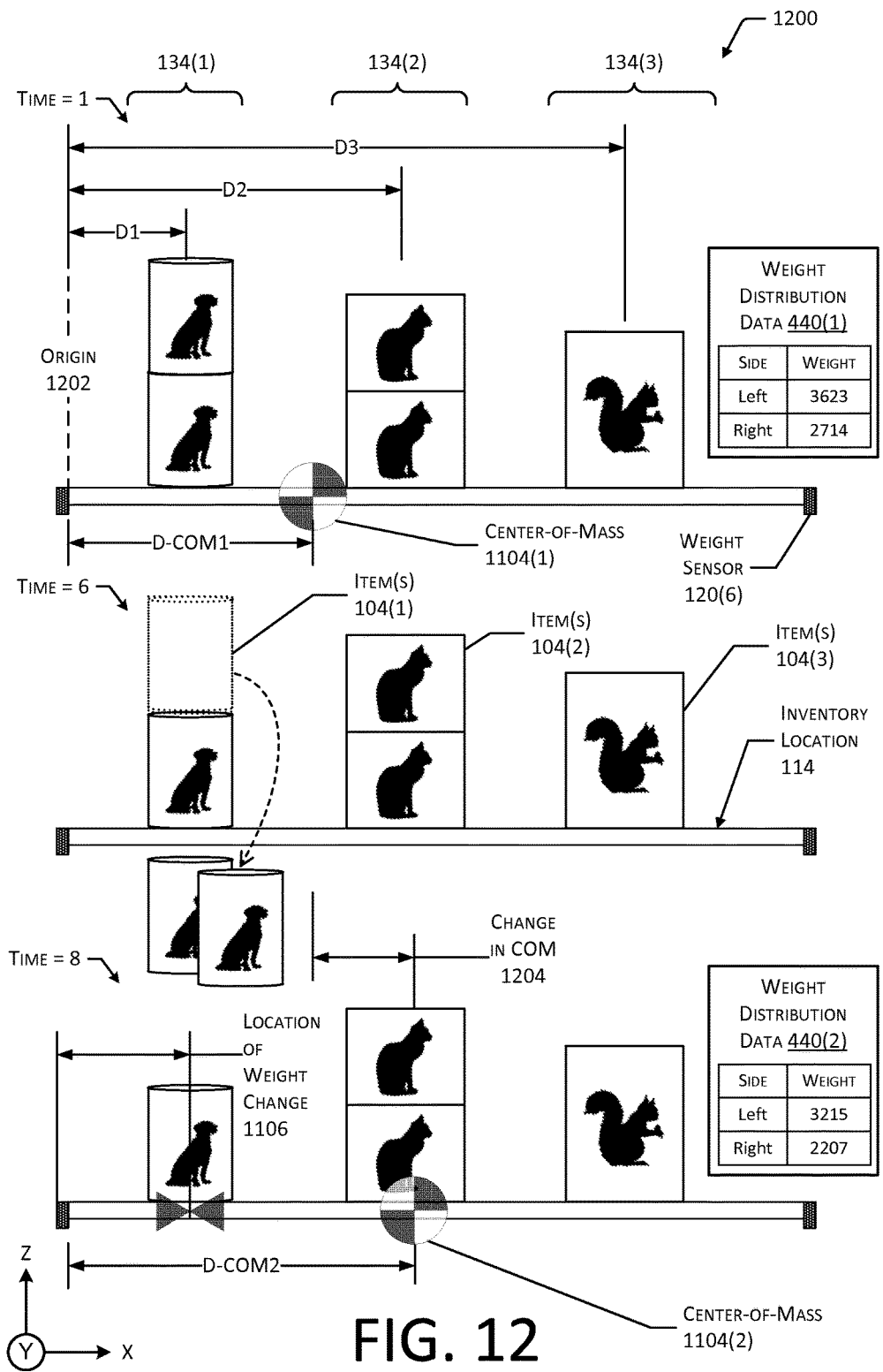
FIG. 12 illustrates a front view of the inventory location before and after removal of an item from the inventory location, according to some implementations.

FIG. 12 illustrates a front view 1200 of an inventory location 114 before and after removal of an item 104 from the inventory location 114, according to some implementations.

In this illustration, a front view is provided for three different times, time=1 before an interaction, time=6 during the interaction, and time=8 after the interaction, as described above with regard to FIG. 10. An origin 1202 is designated at the left-most edge of the inventory location 114. At the left and right edges of the inventory location 114 are weight sensors 120(6).

Depicted here are the three partitioned areas 134(1), 134(2), and 134(3) in which items 104(1), 104(2), and 104(3), respectively are arranged in the lanes. Distances from the origin 1202 to the center of each of the items 104 are indicated. For example, distance D1 indicates a distance from the origin 1202 to the item 104(1), distance D2 indicates a distance from the origin 1202 to the item 104(2), and distance D3 indicates a distance from the origin 1202 to the item 104(3).

Based on the item data 134 indicative of the quantity of each item 104, the total weight of items 104 in each of the partitioned areas 134 may be calculated. Using the total weight at each partitioned area 134 and the distance data to the respective items 104, a distance to the first COM (D-COM1) may be calculated.

At time=1, first weight data 126(1) is obtained from the weight sensors 120(6) and used to determine D-COM1. A first weight distribution data 440(1) may be generated from the first weight data 126(1).

At time=6, a quantity of 2 of item 104(1) have been removed from the first partitioned area 134(1), such as resulting from a pick by the user 116.

At time=8, after the interaction has completed, second weight data 126(2) is obtained from the weight sensors 120(6) and used to determine distance to the second COM (D-COM2). A second weight distribution data 440(2) may be generated from the second weight data 126(2).

LWC data 442 may be generated. For example, a difference between the first weight distribution data 440(1) and the second weight distribution data 440(2) may be used to determine the LWC 1106 as depicted here. Continuing the example, the difference between the weight distribution data 440 may be used as input to Equation 2 described above.

A change in COM 1204 may be determined by subtracting D-COM2 from D-COM1, or vice versa. The direction of the change along the inventory location 114 relative to the origin 1202 may be indicated by the sign of the difference. For example, a change in COM 1204 having a positive sign may be indicative of a shift in the COM 1104 to the left, while a negative sign may be indicative of a shift to the right. The weight characteristic data 436 may include one or more of the position of the COM 1104 (such as the value of the distance to the COM 1104), change in COM 1204 (both magnitude and direction), and so forth. Similarly, a change in weight distribution may be determined by subtracting the second weight distribution data 440(2) from the first weight distribution data 440(1).

The weight distribution data 440, location of the COM 1104 relative to the inventory location 114, the LWC 1106, the change in COM 1204, or other weight characteristic data 436 may be used by the processing module 328 to determine interaction data 340 by selecting or discarding various hypotheses. For example, the change in weight of the inventory location 114 and the LWC 1106 may be indicative of the removal of two items 104(1) from the first partitioned area 134(1). The LWC 1106 may be used to associate an interaction with a particular partitioned area 134 at the inventory location 114.

Depending on the weight of the items 104, the positioning of the partitioned areas 134, and so forth, there may be many situations where a particular set of weight characteristic data 436 may correspond to more than one possible interaction. These possibilities may be expressed as the hypotheses data 338. The hypotheses data 338 may comprise different combinations of quantities of items 104, their respective placement within partitioned areas 134, and so forth. By comparing the measured weight characteristic data 436 with the predicted weight characteristic data 436 in the hypotheses data 338, the interaction data 340 may be determined by the inventory management system 122. However, in some implementations, the predicted weight characteristics for more than one hypothesis may be within a threshold value of the measured weight characteristics. As described below, potential ambiguities between possible solutions in the hypotheses data 338 may be resolved using non-weight data 128.

Illustrative Processes Using Non-Weight Data to Disambiguate Interactions

As mentioned above, weight data 126 is useful in determining the interactions taking place within the facility 102. However, sometimes the weight data 126 is not able to unambiguously determine the outcome that measuredly occurred. Described next are techniques for using non-weight data 128 to disambiguate between possible hypotheses in order to accurately determine the interaction.

Figure 13:
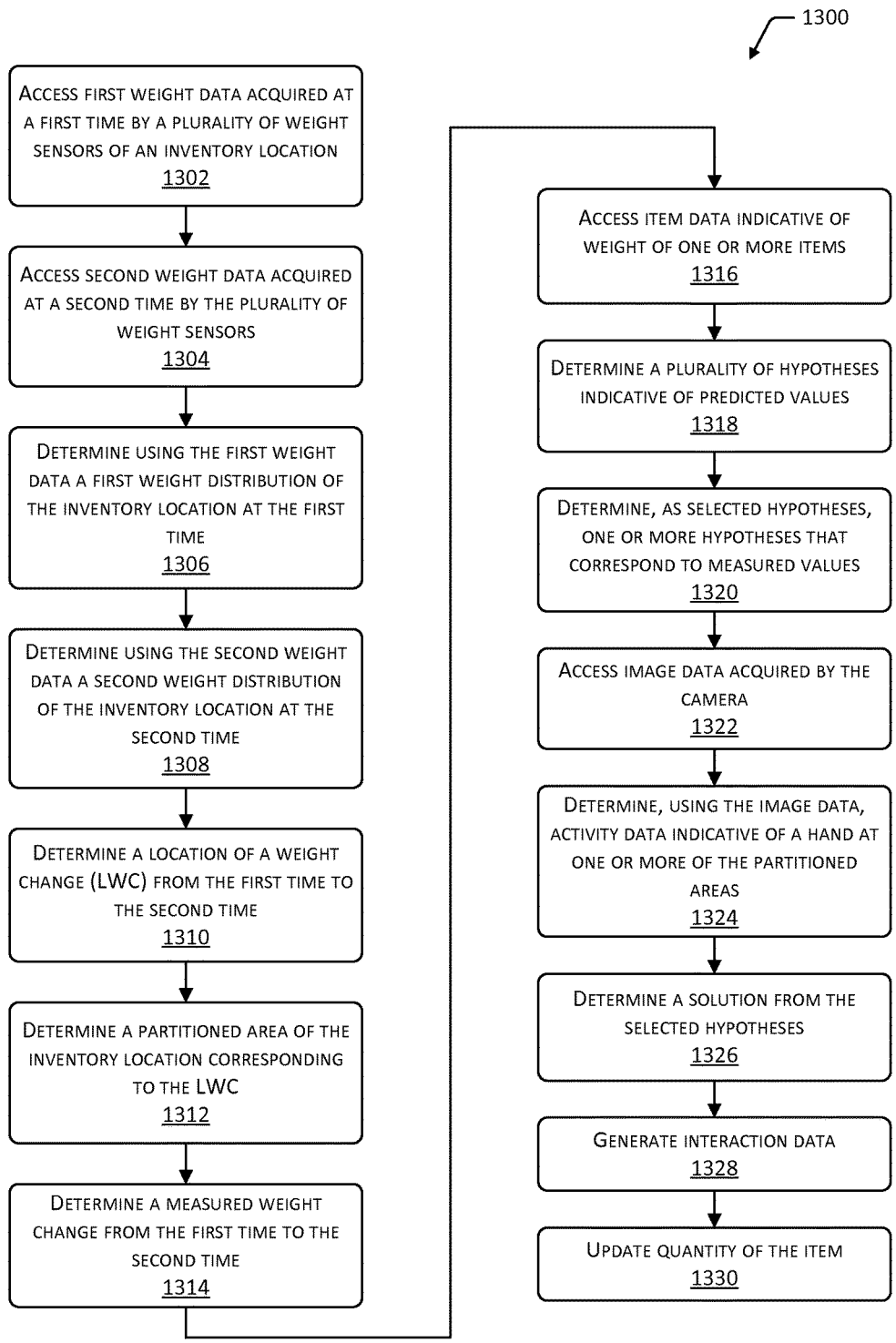
FIG. 13 depicts a flow diagram of a process for determining an interaction with a particular inventory location or portion thereof, based on weight data and non-weight data, according to some implementations.

FIG. 13 depicts a flow diagram 1300 of a process for determining an interaction with a particular inventory location 114 or portion thereof, based on weight data 126 and non-weight data 128, according to some implementations. The process may be implemented at least in part by the inventory management module 324. In different implementations, one or more of the blocks described below may be omitted, the sequence of the process using these blocks may vary from that depicted, and so forth.

Block 1302 accesses first weight data 126(1) acquired by a plurality of weight sensors 120(6) of an inventory location 114 at a first time. For example, the inventory location 114 may be a shelf 302 having a weight sensor 120(6) arranged at each of the four corners of the shelf 602.

Block 1304 accesses second weight data 126(2) acquired by the plurality of weight sensors 120(6) at a second time.

The weight data 126 may be indicative of a weight at a particular weight sensor 120(6), or a sum of two or more weights from a group of weight sensors 120(6). For example, the weight data 126 may provide weights for each of the weight sensors 120(6), or may comprise summed weights from the weight sensors 120(6) on the left and right, respectively, such as described below.

Block 1306 determines, using the first weight data 126(1), first weight distribution data 440(1) of the inventory location 114 at the first time. For example, two weight sensors 120(6) may be arranged on a left side of the inventory location 114, and two weight sensors 120(6) may be arranged on the right side of the inventory location 114. The processing module 328 may generate a first left side weight by summing the weight data 126(1) acquired at the first time from one or more of the plurality of weight sensors 120(6) arranged proximate to a left side of the inventory location 114. A first right side weight may be generated by summing the weight data acquired at the first time from one or more of the plurality of weight sensors 120(6) arranged proximate to a right side of the shelf 602. The first weight distribution data 440(1) may thus comprise the first left side weight and the first right side weight. The difference between the first weight distribution and the second weight distribution may be determined by subtracting the left side weight obtained at the first time from the left side weight obtained at the second time to generate a left side difference and subtracting the right side weight obtained at the first time from the right side weight obtained at the second time to generate a right side difference.

Block 1308 determines, using the second weight data 126(2), second weight distribution data 440(2) of the inventory location 114 at the second time. For example, the processing module 328 may generate a second left side weight by summing the weight data 126 acquired at the second time from one or more of the plurality of weight sensors 120(6) arranged proximate to the left side of the inventory location 114. A second right side weight may be generated by summing the weight data 126 acquired at the second time from one or more of the plurality of weight sensors 120(6) arranged proximate to the right side of the inventory location 114.

Block 1310 determines a LWC 1106 from the first time to the second time using the first weight distribution data 440(1) and the second weight distribution data 440(2). For example, the LWC 1106 may be determined using a difference between the first weight distribution data 440(1) and the second weight distribution data 440(2).

Block 1312 determines a partitioned area 134 corresponding to the LWC 1106. For example, the LWC 1106 indicating the coordinates of where the weight at the inventory location 114 changed with respect to the origin 1202 may be compared with the partition coordinates 418 or other information to determine which of the partitioned areas 134 the LWC 1106 is within.

Block 1314 determines measured weight change data 438 based on a difference between the first weight data 126(1) and the second weight data 126(2) measured by the weight sensors 120(6). For example, the value of the second weight data 126(2) indicative of a total weight at the second time may be subtracted from the first weight data 126(1) indicative of the total weight at the first time.

Block 1316 accesses item data 136 indicative of weight of one or more items 104 and the relative placement of the one or more items 104 within the partitioned areas 134. For example, the item data 136 may indicate that a quantity of 6 of items #12345 having a per-item weight of 455 g and a total weight of 2,730 g are on hand at the first partitioned area 134(1). In other implementations, the item data 136 may indicate a weight for a particular sample size, such as weight of 25 items 104, weight of a package of items 104, and so forth.

Block 1318 determines a plurality of hypotheses indicative of predicted values. For example, the hypotheses data 338 storing the plurality of hypotheses may be retrieved from the memory 316. The plurality of hypotheses is indicative of one or more of predicted weight change data 438, predicted LWC 1106, or other predicted weight characteristic data 436. The hypotheses data 338 is based on combinations of predicted items, predicted partitioned areas, and predicted quantities. For each of the combinations present in the hypotheses data 338, predicted values may be provided. For example, the predicted weight change may be a total weight based on the predicted quantity and given the weight of an individual item 104.

The hypotheses data 338 may include n hypotheses, each comprising a different iteration through different quantities of item #12345 at partitioned area 134(1) and different quantities of other items 104 in different partitioned areas 134 at the same inventory location 114 (and thus included in the weight data 126). The hypotheses data 338 may be at least partially precomputed or may be generated on demand. For example, the previously stored item data 136 associated with the inventory location 114 may be used to generate the hypotheses data 338.

The hypotheses may also include predicted weight distribution data 440 of the inventory location 114 based on the predicted quantities of types of items 104 predicted to be stowed therein. For example, the weight distribution may be based on stowage of a first predicted quantity of the first item 104(1) and a second predicted quantity of the second item 104(2) at the inventory location 114.

The hypotheses may also include data about predicted changes in weight distribution. For example, the predicted changes in weight distribution indicate a predicted net change in the weight measured at the left weight sensors 120(6) and the right weight sensors 120(6), respectively. The net change may comprise a difference between a first predicted quantity of items 104 and a second predicted quantity of items 104.

As described above, the hypotheses data 338 may be constrained. For example, the hypotheses data 338 may exclude situations such as a simultaneous pick and place in the same interaction, simultaneous removal from different partitioned areas 134, interactions involving a minimum or maximum number of items 104, and so forth. In another example, particular interactions may be considered. For example, the hypotheses data 338 may include pick of a first item 104(1) and place of a second item 104(2) that occur within a threshold amount of time of one another.

In one implementation, the constraints may be used during the creation of hypotheses data 338. For example, the hypotheses in the hypotheses data 338 may only include those with predicted quantities that are between the minimum and maximum number of items 104. In other implementations, the constraints may be applied to disregard or reduce the number of hypotheses under consideration as possible solutions.

Block 1320 determines, as selected hypotheses, one or more hypotheses from the hypotheses data 338 using measured weight characteristics obtained or derived from sensor data 124. The determination of the hypotheses may comprise selecting the one or more hypotheses with predicted weight characteristics that correspond to at least one or more of the measured weight characteristics. For example, the hypotheses having predicted LWC 1106 that is within a threshold distance of the measured LWC 1106 may be selected. In another example, the hypotheses having predicted weight change data 438 within a threshold value of the measured weight change data 438 may be selected. The threshold values may be expressed as a tolerance. For example, the hypotheses may be selected that have predicted values that are within 10% of the measured values.

In some situations, several hypotheses may correspond to the measured weight characteristics. For example, several of the selected hypotheses may have predicted weight changes or predicted LWC 1106 that are within a threshold value of the measured weight change, measured LWC 1106, and so forth. Non-weight data 128 may be used to disambiguate between these possible alternatives.

Block 1322 accesses non-weight data 128, such as image data 422 acquired by the camera 120(1). The image data 422 may be obtained contemporaneously or within an interval of time corresponding to the acquisition of the weight data 126. For example, a threshold time may be specified, within which the image data 422 and the weight data 126 are to have been acquired to be considered.

Block 1324 determines activity data 336 using the image data 422. For example, the processing module 328 may be configured to determine that the differential data 434 is indicative of motion within the FOV 130, such as from a hand 608 at one or more of the partitioned areas 134, and generate motion data 446. In another example, the processing module 328 may recognize the appearance of a hand 608 in the image data 422, and generate corresponding activity data 336.

Other image processing techniques may be used as well to determine other information about the activity. For example, the image data 422 may be processed to generate activity data 336 indicative of whether an item 104 was added or removed to the partitioned area 134. Continuing the example, this additional activity data 336 may be used to determine which hypotheses to select or disregard.

Block 1326 determines, as a solution, one or more of the selected hypotheses that correspond most closely with the activity data 336. The activity data 336 may be used to disambiguate between the selected hypotheses and select as a solution the selected hypothesis that is consistent with the activity data 336. The correspondence may include one or more of an exact match or when the predicted values of the hypotheses are within a threshold value of the activity data 336 or information based thereon.

In one implementation, the solution may be the selected hypothesis that has a predicted partitioned area 134 that matches the partitioned area 134 indicated by the sensor data 124. Continuing the example, the solution may be the one of the selected hypotheses for which the predicted partitioned area 134 matches the one of the plurality of partitioned areas 134 that the location of weight change 1106 is within and the one of the plurality of partitioned areas 134 indicated in the activity data 336. In another example with respect to FIG. 12, the solution may be Hypothesis 1 (as described above) that has a predicted partitioned area 134(1) that matches the LWC 1106 from the weight data 126 that occurred within the partitioned area 134(1), and for which the activity data 336 reports motion at the partitioned area 134(1).

Determination of the solution may be based on other factors. For example, the activity data 336 may indicate one or more of addition or removal of an item 104 to the one of the plurality of partitioned areas 134 in the inventory location 114. The determination of the solution may be based on the one of the selected hypotheses having a predicted quantity that is consistent with the one or more of addition or removal of an item 104. Continuing the example, where the activity data 336 indicates removal of an item 104, the solution would be one of the selected hypotheses that represented a pick of the item 104.

Block 1328 generates interaction data 340. For example, the interaction data 340 may be generated based on the solution. As described above, the interaction data 340 may be indicative of one or more of pick, place, touch, and so forth, of a particular quantity of an item 104 at the partitioned area 134 as described by the solution.

Block 1330 updates, using the interaction data 340, quantity data 412 stored in the item data 136. For example, where the interaction data 340 indicates removal of a quantity of one item 104(1) from the first partitioned area 134(1), the quantity data 412 for the first partitioned area 134(1) may be decreased by one.

Figure 14:
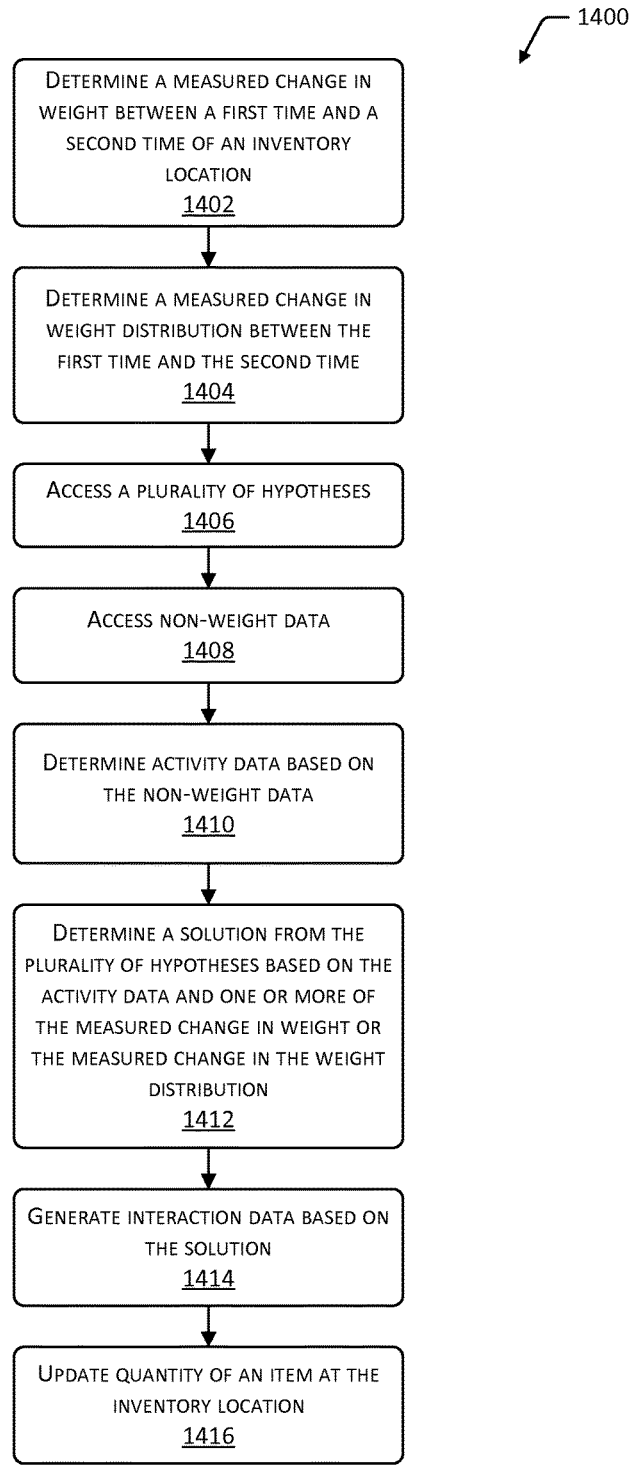
FIG. 14 depicts a flow diagram of another process for generating information indicative of an interaction such as a pick or place of an item, according to some implementations.

FIG. 14 depicts a flow diagram 1400 of another process for generating information indicative of an interaction such as a pick or place of an item 104, according to some implementations. The process may be implemented at least in part by the inventory management module 324. In different implementations, one or more of the blocks described below may be omitted, the sequence of the process using these blocks may vary from that depicted, and so forth.

Block 1402 determines a measured change in weight data 126 generated by one or more weight sensors 120(6) of an inventory location 114 between a first time and a second time. For example, the weight data 126 may indicate a decrease in weight of 910 g.

Block 1404 determines a measured change in weight distribution between the first time and the second time. For example, based on the weight data 126, the processing module 328 may generate first weight distribution data 440(1) for the first time and second weight distribution data 440(2) for the second time. The values of the second weight distribution data 440(2) may be subtracted from the first weight distribution data 440(1) (or vice versa) to generate the measured change in weight distribution data 440, as described above.

In some implementations, the operations of one or more of block 1402 or 1404 may be responsive to a change in the activity data 336. For example, the non-weight data 128 may comprise information from a proximity sensor 120(14). Based on information from the proximity sensor 120(14), the processing of the weight data 126 may be performed.

Block 1406 accesses hypotheses data 338. As described above, the hypotheses data 338 may comprise a plurality of hypotheses indicative of predicted values of one or more of changes in weight, LWC 1106, weight distribution, COM 1104, or other weight characteristics for different combinations of items 104 and quantities of those items 104 at different partitioned areas 134. In some implementations, the hypotheses data 338 may include other variables.

The hypotheses data 338 may be generated or retrieved subject to one or more constraints. Constraint data may be accessed, and the plurality of hypotheses may be generated in accordance with the one or more constraints. For example, the constraints may specify a minimum and a maximum number of items 104 that may be assumed to be interacted with. The hypotheses data 338 may thus be limited to those predicted values corresponding to interactions involving the number of items 104 between the minimum and maximum. Other constraints may include, but are not limited to, situations such as a simultaneous pick and place in the same interaction, simultaneous removal from different partitioned areas 134, and so forth. Hypotheses in the hypotheses data 338 that do not comply with the constraint data may be disregarded or removed.

Block 1408 accesses non-weight data 128 acquired by one or more of the non-weight sensors 120. For example, the non-weight data 128 may include image data 422 generated by the camera 120(1), optical sensor array 120(13), and so forth. In implementations where the image data 422 is acquired by a camera 120(1), the FOV 130 of the camera 120(1) may be configured to include at least a portion of the inventory location 114. For example, the camera 120(1) may be mounted above a shelf 602 and look down onto the shelf 602. The weight data 126 and the non-weight data 128 may be acquired within a threshold time of one another. For example, the threshold time may comprise 100 milliseconds. In this example, non-weight data 128 having timestamps with a difference in time of less than 100 ms of timestamps of the weight data 126 may be accessed and used in the subsequent process.

Block 1410 determines activity data 336 based on the non-weight data 128. For example, the processing module 328 may process the image data 422 to determine presence of a hand 608 at the inventory location 114. In another example, the processing module 328 may process non-weight data 128 from a proximity sensor 120(14) to determine the presence of another object at the inventory location 114.

In implementations where the non-weight data 128 comprises image data 422, one or more image processing techniques may be used. One technique may be comparing a plurality of the images to determine a change between the plurality of images. Another technique may be recognizing a shape of an object in at least a portion of the plurality of images.

In some implementations, the non-weight data 128 may be used to generate other information. For example, the non-weight data 128 may be used to determine a count of the number of items 104 picked from or stowed to the inventory location 114. Continuing the example, image processing techniques such as an artificial neural network or cascade classifiers may be used to determine, using the image data 422 from one or more cameras 120(1), the quantity of items 104 picked or placed. This processing may be computationally intensive, and in some implementations may be reserved for use when the weight characteristic data 436 is uncertain or unavailable.

In some implementations, the processing of the non-weight data 128 may be performed responsive to other input. For example, processing the non-weight data 128 may be responsive to the change in the weight between the first time and the second time exceeding a threshold value. Continuing the example, following a change in weight that exceed the threshold value, the processing module 328 may access previously acquired non-weight data 128 at one or more of before, during, or after, the change in weight for processing.

Block 1412 determines one or more hypotheses of the hypotheses data 338 as a solution. In some implementations where more than one hypothesis is selected, the several selected hypotheses may be merged or otherwise combined to form a single hypothesis. The determination may be for the one or more hypotheses that have predicted values that correspond to the activity data 336 and one or more of the measured change in weight, measured LWC 1106, measured change in the COM 1204, and so forth. The correspondence may include one or more of an exact match or when the predicted values of the hypotheses are within a threshold value of the sensor data 124 or information based thereon. As described above, the correspondence between the measured values and predicted values may not be exact. In some implementations, the selection of the one or more hypotheses may involve determining the hypotheses having least deviation from one or more of the measured values such as the measured change in the weight, the measured change in the COM 1204, or the activity data 336.

In some implementations, prior to or during selection, hypotheses data 338 may be filtered based at least in part on the activity data 336. As described above, the activity data 336 may be indicative of one or more of: location data 444 such as a particular location at the inventory location 114 such as a partitioned area 134, motion data 446 indicative of removal of the item 104 from the inventory location 114, or motion data 446 indicative of placement of the item 104 to the inventory location 114. The determination of the solution may disregard those hypotheses of the plurality of hypotheses for which the activity data 336 differs from a predication in the hypotheses, by at least a threshold value. For example, should the activity data 336 indicate that an item 104 was removed from the inventory location 114, those hypotheses that involve placement to the inventory location 114 may be disregarded from consideration.

Block 1414 generates interaction data 340 based on the solution. For example, the predicted quantities and whether those quantities were added or removed from the inventory location 114 may be used to generate the interaction data 340. The predicted quantities and whether those quantities were added or removed may be consistent with the occurrence of activity represented by the sensor data 124. Interaction data 340 based on those predicted quantities in the solution may then be generated.

Block 1416 updates quantity data 412 based at least in part on the interaction data 340. Continuing the example above, the predicted quantities in the selected solution may be used to change the quantity on hand at that inventory location 114 as maintained by the inventory management system 122.

By performing the process described above, the system 100 is able to accurately determine interactions such as pick or place of items 104 to inventory locations 114. This information may be used to maintain information about operation of the facility 102, such as quantity on hand of an item 104 at a particular partitioned area 134 at a particular time.

Figure 15:
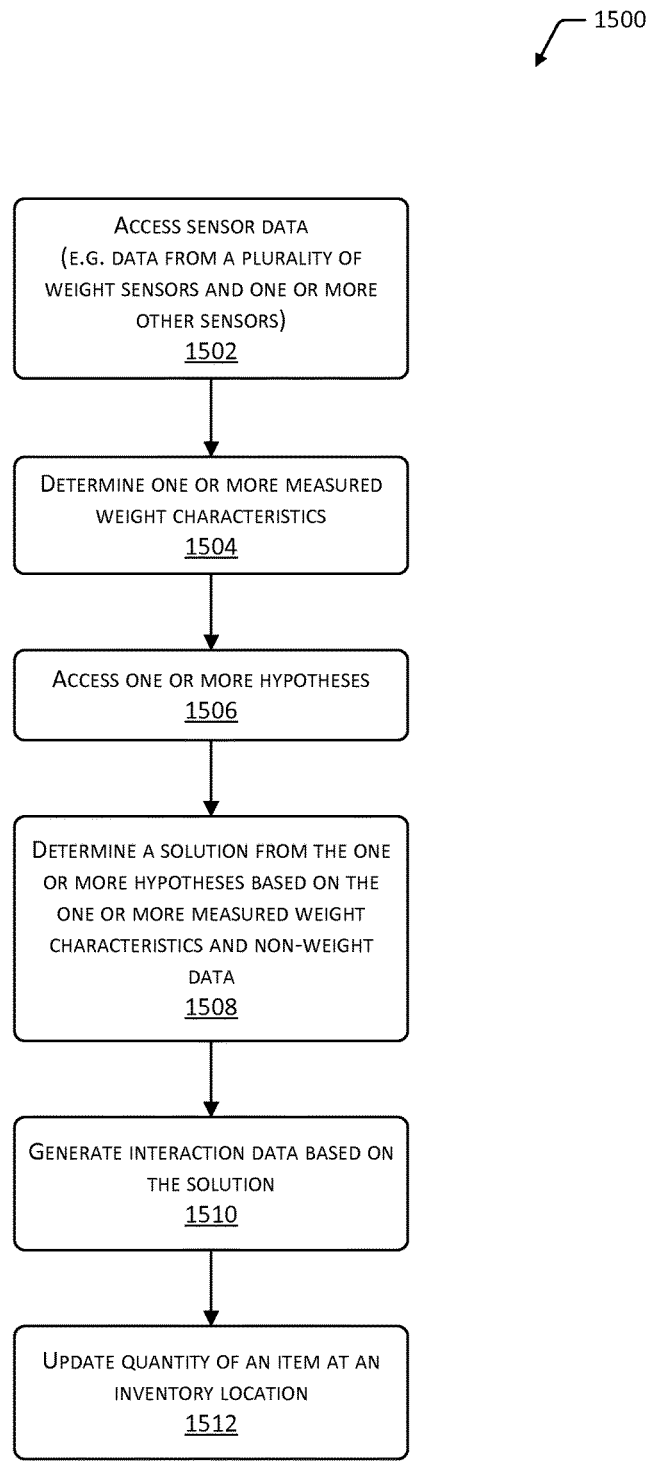
FIG. 15 depicts a flow diagram of another process for determining interaction with an item based on weight data and non-weight data, according to some implementations.

FIG. 15 depicts a flow diagram 1500 of another process for determining interaction with an item 104 based on a weight data 126 and non-weight data 128, according to some implementations. The process may be implemented at least in part by the inventory management module 324. In different implementations, one or more of the blocks described below may be omitted, the sequence of the process using these blocks may vary from that depicted, and so forth.

Block 1502 accesses sensor data 124, such as non-weight data 128 acquired by one or more non-weight sensors 120. The non-weight data 128 may comprise image data 422 generated from at least one of a camera 120(1) or an optical sensor array 120(13).

In some implementations, the non-weight data 128 may be generated that is indicative of activity, such as one or more of a particular location of an item 104 on a platform of the inventory location 114 supporting the load, removal of the item 104 from the platform, or placement of the item 104 to the platform.

Block 1504 determines one or more measured weight characteristics of a load measured by a plurality of weight sensors 120(1). For example, the weight data 126 from a plurality of weight sensors 120(6) weighing the shelf 602 with items 104 thereon may be used to generate weight characteristic data 436. The weight characteristic data 436 may include measured weight change data 438 indicative of a change in weight between a first time and a second time, measured weight distribution data 440 such as a change in COM 1204 between the first time and the second time, a location or position of the COM, location of measured weight change data 442, and so forth. For example, the one or more measured weight characteristics include one or more of a change in measured weight between a first time and a second time, or a change in measured weight distribution between the first time and the second time.

Block 1506 accesses one or more hypotheses. The one or more hypotheses may be stored in, or retrieved from, the hypotheses data 338. The hypotheses data 338 may include one or more hypotheses, with each hypothesis indicative of one or more of addition or removal of particular quantities of particular items 104 from particular locations within the load. Each hypothesis may reflect a different permutation of possible interactions with regard to the inventory location 114. For example, the hypotheses data 338 may contain predicted values for weight characteristics in different scenarios such as different quantities of items 104 added to or removed from different partitioned areas 134.

The hypotheses data 338 may be generated using the data about the physical configuration of the facility 102 and the items 104. Data accessed may include, but is not limited to, one or more of physical dimensions of a platform supporting the load, weight of particular items 104 associated with the load, or particular locations for stowage on the platform. The physical dimensions of the platform may comprise measurements of the shelf 602 or other inventory location 114. The weight of particular items 104 associated with the load may comprise information based on previously stored item data 136 such as item weight data 404 and quantity data 412. The particular locations for stowage on the platform may comprise the partition data 330, such as the partition coordinates 418 designating the boundaries of the partitioned areas 134 at an inventory location 114.

Generation of the hypotheses data 338 may comprise designating a predicted quantity of the particular items 104. This may be a variable that is iterated through a range, such as from a minimum to a maximum. The predicted quantity of items 104 and given placement of the predicted quantity of items 104 at one or more of the particular partitioned areas 134 may be used to calculate a predicted COM, a predicted change in weight, predicted location of weight change, and so forth. One or more of the predicted quantity, predicted data indicative of the one or more particular locations, the predicted COM, the predicted change in weight, the predicted location of weight change, and so forth, may then be stored as the hypotheses data 338.

The hypotheses data 338 may include one or more predicted weight characteristics. For example, a change in predicted weight based on the predicted one or more of place or pick of predicated quantities of the predicted items 104 may be determined. In another example, a change in predicted weight distribution based on the predicted one or more of place or pick of predicted quantities of the predicted items 104 from the predicted location such as a partitioned area 134 may be determined.

Block 1508 determines a solution from the hypotheses data 338, based at least in part on the predicted values in the hypotheses to the one or more measured weight characteristics and the non-weight data 128. As described above, the determination may be made based on one or more of an exact match or when the predicted values of the hypotheses are within a threshold value of the sensor data 124 or information based thereon.

Block 1510 generates interaction data 340 based on the selected hypothesis. For example, the predicted values of quantity, partitioned area 134, and so forth, in the selected hypothesis may be used to produce the interaction data 340. Block 1512 performs other operations using the interaction data 340. For example, the quantity of the items 104 stowed at the partitioned area 134 may be updated.

Illustrative Processes of Determination and Use of Reliability Data

As mentioned above, weight data 126 may sometimes be unreliable. For example, the weight data 126 obtained from a weight sensor 120(6) as a heavy train moves past the facility 102 may incorrectly show changes in weight when none measuredly took place. Described next are techniques for using non-weight data 128 to determine when the weight data 126 may be deemed reliable or unreliable. The weight data 126 deemed to be reliable may then be used for further processing, such as to generate interaction data 340. The unreliable weight data 126 may be disregarded, processed using other techniques to try and render the weight data 126 reliable, used to generate an exception report, and so forth. The techniques described below may be used to determine reliability for weight data 126 from one or more weight sensors 120(6).

Figure 16:
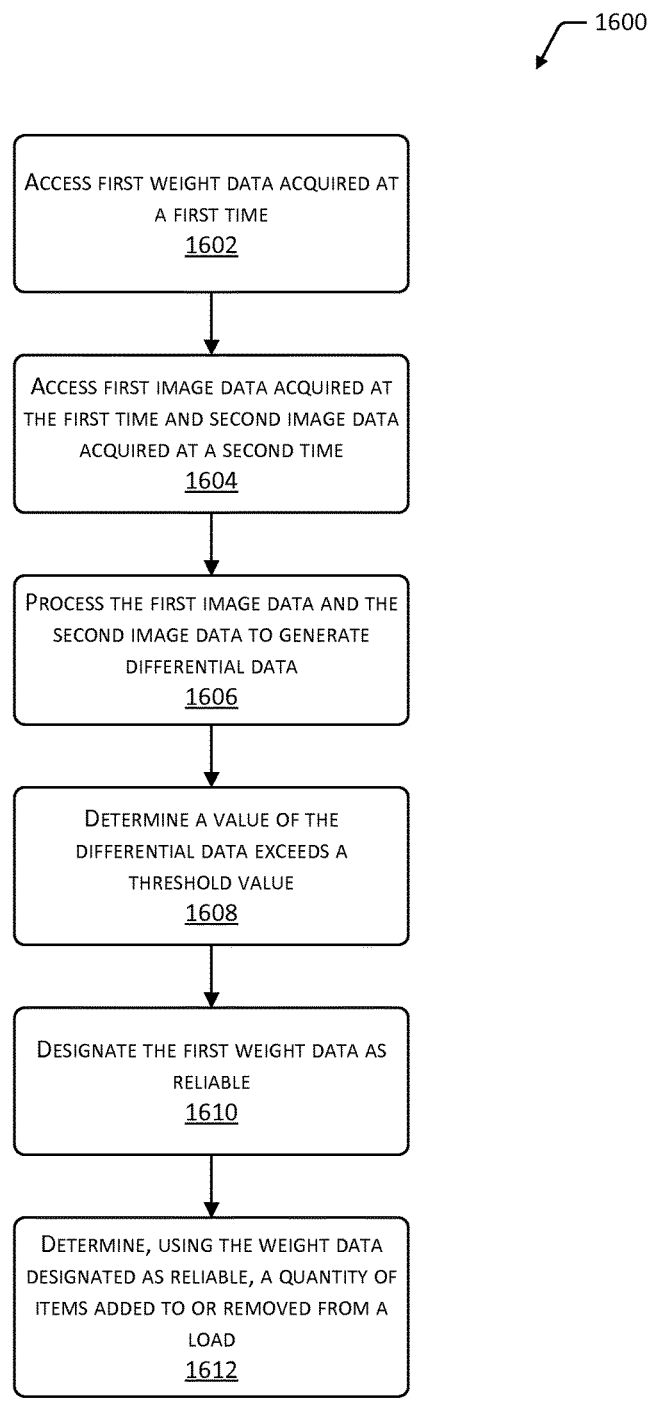
FIG. 16 depicts a flow diagram of a process for determining reliability of weight data using data from non-weight sensors, according to some implementations.

FIG. 16 depicts a flow diagram 1600 of a process for determining reliability of weight data 126 using data from non-weight sensors 120, according to some implementations. The process may be implemented at least in part by the inventory management module 324. In different implementations, one or more of the blocks described below may be omitted, the sequence of the process using these blocks may vary from that depicted, and so forth.

Block 1602 accesses first weight data 126(1) acquired by the weight sensor 120(6) at a first time. The weight sensor 120(6) is configured to determine the weight of a load. For example, the load may include the items 104 at an inventory location 114.

Block 1604 accesses first image data 422(1) acquired by the camera 120(1) at the first time and second image data 422(2) acquired by the camera 120(1) at the second time. In some implementations, the image data 422 may be acquired from the 3D sensor 120(2), optical sensor array 120(13), and so forth.

Block 1606 processes the first image data 422(1) and the second image data 422(2) to generate differential data 434. In one implementation, the processing may comprise image subtraction. Differential data 434 such as a subtracted image may be generated by subtracting the second image data 422(1) from the first image data 422(1) (or vice versa). A count of non-zero pixels 424 in the subtracted image may be performed. The count of the non-zero pixels 424 may be stored as the value of the differential data 434. In other implementations, other values may be obtained, such as data indicative of a contour in the differential data 434.

Block 1608 determines a value of the differential data 434 exceeds a threshold value. For example, the count of non-zero pixels 424 may be greater than a threshold value of zero. In some implementations, the activity data 336 may be determined that is indicative of activity at the inventory location 114 using the differential data 434. In other implementations, the determination of the value of the differential data 434 exceeding the threshold value may be sufficient and used to direct further processing of the data. Continuing the example, given that some pixels 424 changed between the first image data 422(1) and the second image data 422(2), it may be assumed that some activity took place at the inventory location 114.

In other implementations, other techniques may be used. For example, object recognition techniques may be used to identify a hand 608 or other portion of a user 116 or manipulator is active at the inventory location 114. A score or a probability associated with the activity data 336 may be generated. For example, the score may indicate that the probability the object recognized is a hand is 0.95.

Block 1610 designates the first weight data 126(1) as reliable. The designation may include one or more writing a value to memory, changing a flag, sending the first weight data 422(1) to another module for processing, or other action. For example, the reliability data 342 associated with the first weight data 126(1) may be expressed as a binary value of "1" indicating the data is deemed reliable.

Similarly, the weight data 126 may be deemed unreliable using the following process. The value of the differential data 434 may be determined to be less than or equal to a threshold value. Based on the value of the differential data 434 being less than or equal to the threshold value, the activity data 336 is generated indicative of no activity at the inventory location 114. The first weight data 126(1) associated with the first time may then be designated as unreliable.

Block 1612 determines, using the first weight data 126(1) designated as reliable, a quantity of items 104 added to or removed from the load. For example, the weight change data 438 may be divided by the item weight data 404 to determine how many items 104 were added or removed. In other implementations, other processing may be performed on the first weight data 126 that is deemed reliable.

By using the techniques presented, unreliable weight data 126 may be prevented from generating erroneous data in the inventory management system 122. As a result, operation of the facility 102 may benefit from improved accuracy.

Figure 17:
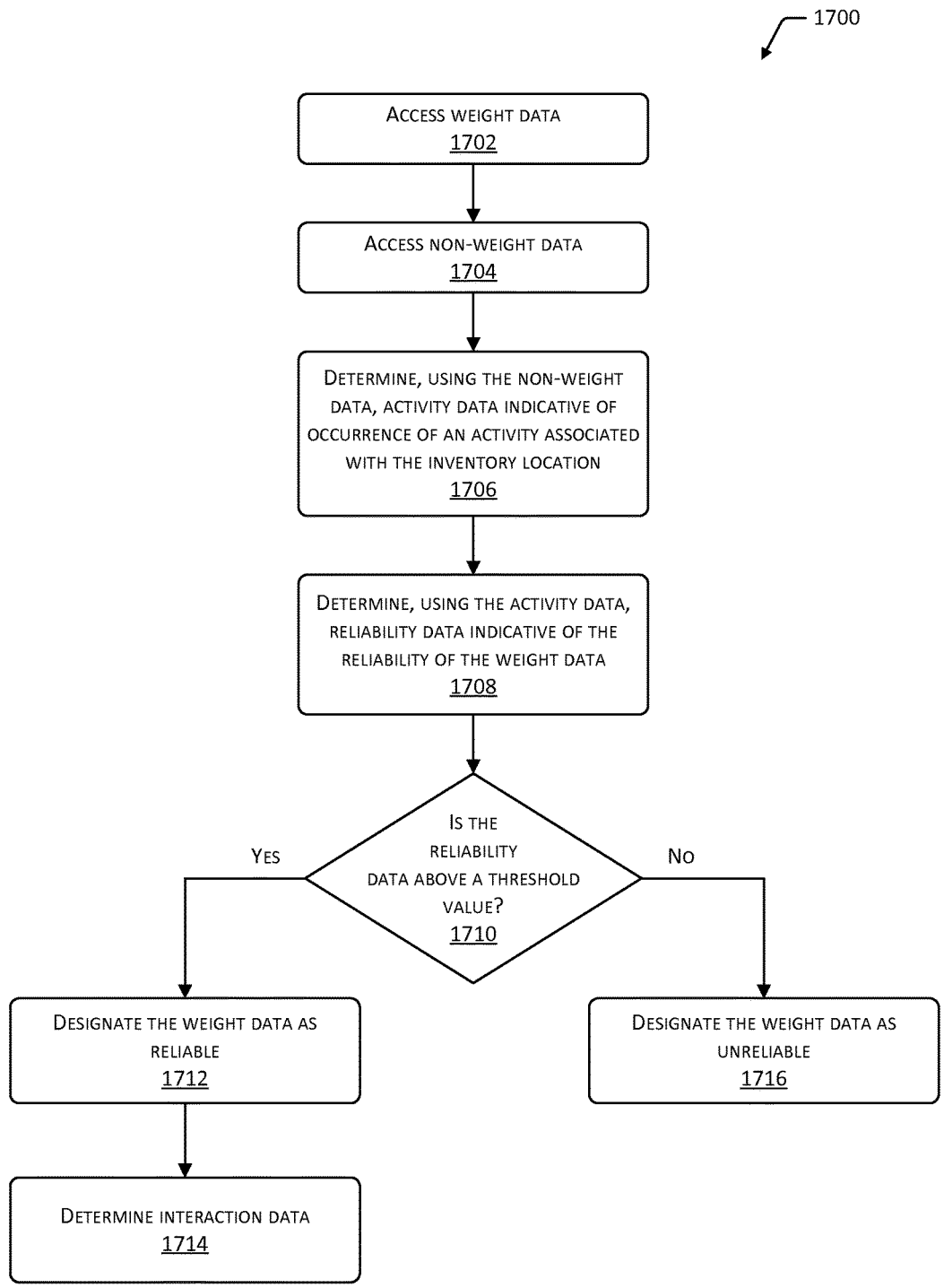
FIG. 17 depicts a flow diagram of another process for determining reliability of weight data using non-weight data, according to some implementations.

FIG. 17 depicts a flow diagram 1700 of another process for determining reliability of weight data 126 using non-weight data 128, according to some implementations. The process may be implemented at least in part by the inventory management module 324. In different implementations, one or more of the blocks described below may be omitted, the sequence of the process using these blocks may vary from that depicted, and so forth.

Block 1702 accesses the weight data 126 acquired by one or more of the weight sensors 120(6).

Block 1704 accesses the non-weight data 128 acquired by one or more of the non-weight sensors 120. In one implementation, the non-weight data 128 may comprise image data 422, proximity sensor data, 3D data, and so forth. For example, the non-weight data 128 may comprise a plurality of images obtained from an optical sensor array 120(13). In another example, the non-weight data 128 may comprise a plurality of images obtained from a camera 120(1). The FOV 130 of the camera 120(1) or other non-weight sensor 120 may be configured to include at least a portion of the inventory location 114. In some implementations, the non-weight sensor 120 may be overhead, and the FOV 130 may be directed down.

Block 1706 determines, using the non-weight data 128, activity data 336 indicative of occurrence of an activity associated with the inventory location 114, or a portion thereof. For example, the activity data 336 may indicate presence of a user 116 in front of the inventory location 114.

As described above, the activity data 336 may be determined in several ways. In one implementations, object recognition techniques such as artificial neural networks, cascade classifiers, and so forth, may be used to recognize a hand 608 proximate to the inventory location 114 in the one or more images such as obtained from the camera 120(1), optical sensor array 120(13), or other sensor 120(5). Once recognized, motion of the hand 608 may be tracked to determine the hand 608 is moving one or more items 104 with respect to the inventory location 114. For example, the item 104 may be recognized as an item 104 (or as a "not-hand") and tracked to generate motion data 446 such as the hand 608 was picking from or placing to the inventory location 114.

The activity data 336 may also be determined from the image data 422 generated by the optical sensor array 120 (13). In one implementation, first image data 422(1) may be acquired by the optical sensor array 120(13) at a first time and second image data 422(2) acquired by the optical sensor array 120(13) at a second time may be accessed. The first image data 422(1) and the second image data 422(2) may be processed to generate differential data 434. For example, the first image data 422(1) may be subtracted from the second image data 422(2), or vice versa. The activity data 336 may then be generated based on whether the differential data 434 exceeds a threshold. For example, if the count of pixels 424 in the differential image exceeds the threshold, the differential data 434 may be indicative of activity.

Other image processing techniques may also be used. In one implementation, changes in gradients between images may be used to generate activity data 336. A first image gradient may be determined for a first image acquired at a first time. A second image gradient may be determined for a second image acquired at a second time. The gradient of the image may be determined using one or more of the OpenCV functions cv2.Sobel( ), cv2.Scharr( ), cv2Laplacian( ), and so forth. The first gradient image may be subtracted from the second gradient image (or vice versa) to generate differential data 434. The differential data 434 may be processed as described above, and the determination of the activity data 336 may comprise a determination that the first image gradient and the second image gradient differ by at least a threshold amount. The use of gradients to determine activity may convey various advantages. For example, comparison of gradients may reduce the number of false determinations of actions that may result from lighting changes in the facility 102.

Non-image data may also be used to generate activity data 336. In one implementation, the non-weight data 128 may be obtained from a proximity sensor 120(14). The non-weight data 128 may be determined to indicate proximity of an object, such as the user 116, tote 118, and so forth. A duration of the proximity of the object with respect to the proximity sensor 120(14) may be determined. The duration may be compared with a threshold time. When the duration exceeds the threshold time, activity data 336 may be generated indicating occurrence of an action, such as proximity of the object to the proximity sensor 120(14) or the inventory location 114 associated with the proximity sensor 120(14). For example, the threshold time may comprise 1000 ms. A user 116 walking past the inventory location 114 to which the proximity sensor 120(14) is affixed will not dwell long enough to register activity. However, should the user 116 pause at the inventory location 114, they will be detected by the proximity sensor 120(14) and activity data 336 indicative thereof may be generated.

Block 1708 determines, using the activity data 336, reliability data 342. The reliability data 342 is indicative of the reliability of the weight data 126. For example, reliability data 342 indicative of reliability indicates that the weight data 126 associated therewith is deemed to be suitable for use in certain operations, such as determining a change in quantity. Likewise, reliability data 342 indicative of unreliability indicates that the weight data 126 may be noisy or otherwise contain information that is inaccurate and thus should not be used for certain operations.

The weight data 126 and the non-weight data 128 may not be acquired at the same instant in time. As a result, a window or time interval may be used to allow for a correspondence between the weight data 126 and the non-weight data 128. In one implementation, the reliability data 342 may indicate weight data 126 acquired within a time interval of the occurrence of the activity is reliable. Continuing the example, the time interval may be designated as 200 ms, and as such weight data 126 occurring within 200 ms of the activity may be associated with that activity.

Block 1710 determines if the reliability data 342 is above a threshold value. When the reliability data 342 is above the threshold value, the process proceeds to block 1712. Block 1712 designates the weight data 126 as reliable and may be used for subsequent operations, such as block 1714.

Block 1714 determines interaction data 340 based on the weight data 126. In some implementations, the interaction data 340 may be further determined using the activity data 336 such as described above.

The interaction data 340 may be used to determine a change in quantity of the one or more items 104 at the inventory location 114. For example, using the measured weight data 126 that has been deemed reliable, weight distribution data 440 may be determined such as a LWC, change in COM 1204, and so forth. The change in weight distribution data 440 may be associated with a location on the platform. Using the location on the platform, an item identifier may be determined, providing identification for the item 104 in the interaction. For example, the location on the platform may be 10 cm from the origin 1202, which corresponds to the first partitioned area 134(1).

The weight change data 438 may also be determined and used to determine a quantity of items 104 in the interaction, such as described above. For example, the item data 136 indicative of a weight of an individual item 104 may be accessed. The measured weight change may be determined by subtracting weight data 126 acquired at a first time from weight data 126 acquired at a second time. The measured weight change may be divided by the weight of the individual item 104 to generate a quotient. The quotient may be rounded to an integer value, and the integer value may be designated as the change in the quantity of the item. The mathematical sign (such as positive or negative) of the measured weight change may be used to indicate the interaction was a pick or a place.

As also described above, the interaction data 340 may be indicative of interaction types 454, such as pick of an item 104 from the inventory location 114, place of an item 104 to the inventory location 114, or touch made to an item 104 at the inventory location 114.

Returning to block 1710, when the reliability data 342 is not above the threshold value, the process may proceed to block 1716. Block 1716 designates the weight data 126 as unreliable. The process may proceed to disregarding the weight data 126, processing the unreliable weight data 126 using one or more techniques to produce reliable weight data 126, and so forth. For example, the unreliable weight data 126 may be processed using a noise reduction technique to produce de-noised weight data 126.

The processes described above may be used in combination with one another. For example, the reliability data 342 may be used to designate reliable weight data 126, which may then be processed and used to generate information about interaction with ambiguities resolved using non-weight data 128.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a shelf to hold a type of item in one of a plurality of partitioned areas;
a plurality of weight sensors, each weight sensor coupled to the shelf at different points;
a camera with a field-of-view that includes at least a portion of the plurality of partitioned areas; and
a computing device comprising:
a memory, storing computer-executable instructions; and
a hardware processor configured to execute the computer-executable instructions to:
access first weight data acquired by the plurality of weight sensors at a first time;
access second weight data acquired by the plurality of weight sensors at a second time;
determine, using the first weight data, a first weight distribution of the shelf at the first time;
determine, using the second weight data, a second weight distribution of the shelf at the second time;
determine, using a difference between the first weight distribution and the second weight distribution, a location of weight change indicative of a location with respect to the shelf;
determine a partitioned area corresponding to the location of weight change;
determine measured weight change data indicative of a difference between a first total weight at the first time and a second total weight at the second time;
access item data indicative of weight of a single one of the type of item and placement of the type of item within the one of the plurality of partitioned areas;
determine a plurality of hypotheses with each hypothesis indicative of a predicted quantity of the type of item and one or more of:
a predicted weight change for the predicted quantity corresponding to the each hypothesis,
a predicted weight distribution based on the predicted weight change and the placement of the type of item within the one of the plurality of partitioned areas, or
a predicted change in weight distribution based on the predicted weight change and the placement of the type of item within a predicted partitioned area;
determine one or more selected hypotheses from the plurality of hypotheses for which:
the location of weight change is within the one of the plurality of partitioned areas indicated by the item data for the type of item, and
a difference between the measured weight change data and the predicted weight change is less than a threshold value;
access image data acquired by the camera;
determine, using the image data, activity data indicative of a hand at the one of the plurality of partitioned areas;
determine one of the one or more selected hypotheses for which the predicted partitioned area matches:
the one of the plurality of partitioned areas that the location of weight change is within, and
the one of the plurality of partitioned areas indicated in the activity data;
generate, based on the one of the one or more selected hypotheses, interaction data indicative of one or more of pick or place of a quantity of the type of item at the one of the plurality of partitioned areas; and
update, using the interaction data, a quantity stored in the item data.

2. The system of claim 1, further comprising computer-executable instructions to:
determine, using the image data, one or more of addition or removal of the type of item to the one of the plurality of partitioned areas; and
the determination of the one or more selected hypotheses is based on the one or more selected hypotheses having a predicted quantity consistent with the one or more of addition or removal of the type of item.

3. The system of claim 1, the determination of the first weight distribution of the shelf at the first time comprising computer-executable instructions to:
generate a first left side weight by summing first left weight data acquired at the first time from one or more of the plurality of weight sensors arranged proximate to a left side of the shelf;
generate a first right side weight by summing first right weight data acquired at the first time from one or more of the plurality of weight sensors arranged proximate to a right side of the shelf; and
the determination of the second weight distribution of the shelf at the second time comprising computer-executable instructions to:
generate a second left side weight by summing second left weight data acquired at the second time from the one or more of the plurality of weight sensors arranged proximate to the left side of the shelf; and
generate a second right side weight by summing second right weight data acquired at the second time from the one or more of the plurality of weight sensors arranged proximate to the right side of the shelf.

4. The system of claim 3, further comprising computer-executable instructions to determine the difference between the first weight distribution and the second weight distribution by:
subtracting the first left side weight obtained at the first time from the second left side weight obtained at the second time to generate a left side difference; and
subtracting the first right side weight obtained at the first time from the second right side weight obtained at the second time to generate a right side difference.

5. A system comprising:
an inventory location to hold one or more types of items;
a plurality of weight sensors coupled to the inventory location to generate weight data indicative of weight of a load, each of the weight sensors coupled to a different point of the inventory location;
a sensor; and
a computing device comprising:
a memory, storing computer-executable instructions; and
a hardware processor configured to execute the computer-executable instructions to:
determine a measured change in the weight of the load between a first time and a second time;
determine a measured change in weight distribution between the first time and the second time;
determine a plurality of hypotheses, each hypothesis indicative of different combinations of:
the one or more types of items, predicted quantity of each of the one or more types of items, and one or more of: predicted change in weight, or predicted change in weight distribution;
access non-weight data acquired by the sensor;
determine activity data based on the non-weight data; and
determine one of the plurality of hypotheses based on the activity data and one or more of: the measured change in the weight or the measured change in the weight distribution.

6. The system of claim 5, further comprising computer-executable instructions to:
access constraint data indicative of one or more of a minimum quantity of the one or more types of items or a maximum quantity of the one or more types of items; and
after the determination of the plurality of hypotheses, disregard from the determination of the one of the plurality of hypotheses those of the plurality of hypotheses having predicted quantities that are one or more less than the minimum quantity or more than the maximum quantity.

7. The system of claim 5, further comprising computer-executable instructions to:
disregard from the determination of the one of the plurality of hypotheses those of the plurality of hypotheses for which activity data differs from a predication in the hypotheses by at least a threshold value.

8. The system of claim 5, further comprising computer-executable instructions to:
update, using the predicted quantity indicated in the one of the plurality of hypotheses, data indicative of a quantity of the one or more types of items stowed at the inventory location.

9. The system of claim 5, wherein the non-weight data comprises images; and the computer-executable instructions to determine the activity data further comprise one or more computer-executable instructions to:
compare a plurality of the images to determine a change between the plurality of the images, or
determine a contour of an object in at least a portion of the plurality of the images using an artificial neural network.

10. The system of claim 5, the sensor further comprising one or more of:
an optical sensor array comprising a plurality of optical sensors in a two-dimensional arrangement to detect a shadow cast by an object and generate the non-weight data comprising image data indicative of a shape of the shadow;
a camera with a field-of-view that includes at least a portion of the inventory location to generate the non-weight data comprising image data of the portion of the inventory location;
an instrumented auto-facing unit to generate the non-weight data indicative of a change in quantity held by the instrumented auto-facing unit; or
a light curtain to generate touchpoint data and generate the non-weight data comprising a position of a touch relative to the inventory location.

11. The system of claim 5, wherein the activity data comprises information indicative of a count of items picked from or stowed to the inventory location;
further comprising computer-executable instructions to:
access the non-weight data comprising an image; and
processing the image using an artificial neural network to determine the count of items picked from or stowed to the inventory location.

12. The system of claim 5, the computer-executable instructions to determine the one of the plurality of hypotheses further comprising computer-executable instructions to:
determine, from the plurality of hypotheses, the one of the plurality of hypotheses having a least deviation from one or more of: the measured change in the weight and the predicted change in the weight, or the measured change in the weight distribution and the predicted change in weight distribution.

13. The system of claim 5, the computer-executable instructions to determine the activity data further comprising computer-executable instructions to:
determine the measured change in the weight exceeds a threshold value; and initiate the determination of the activity data in response to the determination that the measured change in the weight exceeds the threshold value.

14. The system of claim 5, further comprising computer-executable instructions to:
initiate the determination of the measured change in the weight and the determination of the measured change in the weight distribution responsive to a change in the activity data.

15. A computer implemented method executing on at least one processor, the computer implemented method comprising:
accessing non-weight data acquired by one or more non-weight sensors;
determining one or more measured weight characteristics of a load measured by a plurality of weight sensors;
accessing one or more hypotheses, each hypothesis including:
a predicted quantity of one or more items,
a predicted location within the load of each of the one or more items, and
a predicted weight characteristic based on the predicted quantity and the predicted location for the one or more items;
determining one of the one or more hypotheses based on the one or more measured weight characteristics and the non-weight data; and
generating interaction data based on the one of the one or more hypotheses.

16. The computer implemented method of claim 15, wherein the one or more measured weight characteristics comprise one or more of:
a change in measured weight between a first time and a second time, or
a change in measured weight distribution between the first time and the second time; and
wherein the predicted weight characteristic corresponding to the each hypothesis comprises one or more of:
a change in predicted weight based on predicted one or more of place or pick of predicted quantities of the one or more items, or
a change in predicted weight distribution based on the predicted one or more of place or pick of the predicted quantities of the one or more items from the predicted locations.

17. The computer implemented method of claim 15, wherein the non-weight data comprises one or more images; and further comprising:
acquiring the one or more images using one or more of:
a camera, a three-dimensional sensor, or an optical sensor array.

18. The computer implemented method of claim 15, further comprising:
generating the non-weight data indicative of one or more of:
a location of an item on a platform supporting the load, pick of the item from the platform, or
place of the item to the platform.

19. The computer implemented method of claim 15, further comprising:
accessing data indicative of:
physical dimensions of a platform supporting the load,
weight of an individual one of the one or more items associated with the load, and
locations for stowage of the one or more items on the platform;
designating a quantity of particular items;
calculating, for the quantity of particular items, a predicted weight distribution;
calculating, for the quantity of particular items, a predicted change in weight; and
storing, as the one or more hypotheses, the quantity of particular items as the predicted quantity, the predicted weight distribution, and the predicted change in weight.

20. The computer implemented method of claim 15, the determining the one or more measured weight characteristics of the load comprising:
generating a first weight by summing weight data acquired from one or more of the plurality of weight sensors arranged proximate to a first side of a platform supporting the load; and
generating a second weight by summing weight data acquired from one or more of the plurality of weight sensors arranged proximate to a second side of the platform supporting the load.

21. A computer implemented method comprising:
accessing non-weight data;
determining one or more weight characteristics of a load measured by a plurality of weight sensors;
accessing one or more hypotheses, each hypothesis including:
a predicted quantity of one or more items,
a predicted location within the load of each of the one or more items, and
a predicted weight characteristic; and
determining one of the one or more hypotheses based on the one or more weight characteristics and the non-weight data.

22. A computer implemented method executing on at least one processor, the computer implemented method comprising:
accessing non-weight data acquired by one or more non-weight sensors;
determining weight data acquired by one or more weight sensors;
accessing one or more hypotheses, each hypothesis including:
a predicted quantity of one or more types of items, and
predicted weight data based on the predicted quantity of the one or more types of items;
determining one of the one or more of the hypotheses based on the non-weight data and the weight data; and
generating interaction data based on the one of the one or more of the hypotheses.

* * * * *